United States Patent
Geng et al.

(10) Patent No.: US 12,501,322 B2
(45) Date of Patent: Dec. 16, 2025

(54) CELL RESELECTION METHOD AND SYSTEM, AND APPARATUS

(71) Applicant: Huawei Technologies Co., Ltd., Shenzhen (CN)

(72) Inventors: Tingting Geng, Shanghai (CN); Yedan Wu, Shanghai (CN); Le Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 578 days.

(21) Appl. No.: 17/807,641

(22) Filed: Jun. 17, 2022

(65) Prior Publication Data
US 2022/0322176 A1 Oct. 6, 2022

Related U.S. Application Data

(63) Continuation of application No. PCT/CN2019/127193, filed on Dec. 20, 2019.

(51) Int. Cl.
*H04W 36/00* (2009.01)
*H04W 36/08* (2009.01)
*H04W 36/30* (2009.01)

(52) U.S. Cl.
CPC . *H04W 36/0058* (2018.08); *H04W 36/00838* (2023.05); *H04W 36/083* (2023.05); *H04W 36/304* (2023.05)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS 8,355,729 B2 * 1/2013 Li .................. H04W 36/30
455/445
8,600,388 B2 * 12/2013 Magadi Rangaiah ...............
H04W 48/20
455/437
(Continued)

FOREIGN PATENT DOCUMENTS

CN 103313301 A 9/2013
CN 108391291 A * 8/2018 ............ H04W 36/08
(Continued)

OTHER PUBLICATIONS

3GPP TSG-RAN WG2 #107, Prague, Czech Republic, Aug. 26-30, 2019, Tdoc R2-1910543, Agenda Item: 11.6.4.2, Source: Ericsson, Title: Cell selection/reselection for NTN GEO and LEO. (Year: 2019).*
(Continued)

*Primary Examiner* — Peter G Solinsky
*Assistant Examiner* — Sanjay K Dewan
(74) *Attorney, Agent, or Firm* — Slater Matsil, LLP

(57) ABSTRACT

Embodiments of this application provide a cell reselection method and system, and an apparatus. The method includes: receiving reselection configuration information from a network device, where the reselection configuration information includes reselection trigger information, the reselection trigger information is used to trigger measurement for cell reselection, and the reselection trigger information includes reselection trigger time information or reselection trigger indication information; and performing measurement for cell reselection based on the reselection configuration information. In embodiments of this application, the reselection configuration information including the reselection trigger information is introduced.

20 Claims, 7 Drawing Sheets

(58) Field of Classification Search
CPC ........... H04W 36/0058; H04W 36/083; H04W 36/00838; H04W 36/304; H04W 36/00837; H04W 36/30
USPC .......................................................... 370/331
See application file for complete search history.

(56) References Cited

U.S. PATENT DOCUMENTS

| | | | |
|---|---|---|---|
| 9,204,355 | B2 | 12/2015 | Zhang et al. |
| 2012/0276945 | A1* | 11/2012 | Chindapol ............ H04W 48/20 455/525 |
| 2015/0264603 | A1* | 9/2015 | Yang ..................... H04W 36/24 455/436 |
| 2015/0350973 | A1 | 12/2015 | Yang et al. |
| 2016/0037388 | A1* | 2/2016 | Yang ................... H04W 36/302 370/332 |
| 2018/0035342 | A1 | 2/2018 | Fujishiro et al. |
| 2018/0049087 | A1* | 2/2018 | Lee ....................... H04W 36/08 |
| 2019/0021020 | A1 | 1/2019 | Kim |
| 2023/0135073 | A1* | 5/2023 | Xu .................. H04W 36/00835 370/331 |
| 2023/0189107 | A1* | 6/2023 | Matsuda ............. H04W 36/083 370/331 |
| 2023/0247503 | A1* | 8/2023 | Chen ..................... H04W 48/08 370/331 |
| 2023/0247506 | A1* | 8/2023 | Xu ..................... H04B 7/18541 370/331 |
| 2023/0269635 | A1* | 8/2023 | Xu .................. H04W 36/00835 370/329 |
| 2023/0319661 | A1* | 10/2023 | Määttänen ........ H04W 36/0085 370/331 |
| 2023/0397061 | A1* | 12/2023 | Huang ............... H04W 36/0061 |
| 2024/0089837 | A1* | 3/2024 | Akl ....................... H04W 48/16 |

FOREIGN PATENT DOCUMENTS

| | | | | |
|---|---|---|---|---|
| WO | 2019010049 | A1 | | 1/2019 |
| WO | WO 2020/144572 | A1 * | 7/2020 | ............ H04W 64/00 |
| WO | WO 2022/065929 | A1 * | 3/2022 | ............ H04W 36/00 |
| WO | WO 2024/035173 | A1 * | 2/2024 | ............ H04W 48/20 |
| WO | WO 2024/072855 | A1 * | 4/2024 | ............ H04W 48/12 |

OTHER PUBLICATIONS

3GPP TSG-RAN WG2 Meeting#107, Prague, Czech, Aug. 26-30, 2019, R2-1909261, Source: ZTE Corporation, Sanechips, Title: Utilization of the ephemeris information in cell selection and re-selection, Agenda item: 11.6.4.2. (Year: 2019).*

3GPP TSG RAN WG2 Meeting # 108, Reno, USA, Nov. 18-22, 2019, R2-1915236, Agenda Item: 6.18.2, Source: Sony, Title: Cell selection/reselection with NPN cells. (Year: 2019).*

3GPP TSG-RAN WG2 #107, Prague, Czech Republic, Aug. 26-30, 2019, Tdoc R2-1910543, Agenda Item: 11.6.4.2, Source: Ericsson, Tile: Cell selection/reselection for NTN GEO and LEO. (Year: 2019).*

ZTE Corporation et al., "Utilization of the ephemeris information in cell selection and re-selection", 3GPP TSG-RAN WG2 Meeting#107, R2-1909261, Aug. 26-30, 2019, 3 Pages, Prague, Czech.

Ericsson, "Cell selection/reselection for NTN GEO and LEO", 3GPP TSG-RAN WG2 #107, R2-1910543, Aug. 26-30, 2019, 6 pages, Prague, Czech Republic.

Sony, "Cell selection/reselection with NPN cells", 3GPP TSG RAN WG2 Meeting #108, R2-1915236, Nov. 18-22, 2019, 3 pages, Reno, USA.

* cited by examiner

CELL RESELECTION METHOD AND SYSTEM, AND APPARATUS

CROSS-REFERENCE TO RELATED APPLICATIONS

This application is a continuation of International Application No. PCT/CN2019/127193, filed on Dec. 20, 2019, the disclosure of which is hereby incorporated by reference in its entirety.

TECHNICAL FIELD

This application relates to the field of communication technologies, and in particular, to a cell reselection method and system, and an apparatus.

BACKGROUND

Because a conventional terrestrial network (TN) cannot provide seamless coverage for a terminal device, especially in places in which a network device cannot be deployed, such as a sea, a desert, or the air, a non-terrestrial network NTN) system is introduced into a fifth generation (5th generation, 5G) system. The NTN system may include a satellite communication system, a high altitude platform station (HAPS) communication system, or another non-terrestrial communication system. In the NTN system, network device functions or some network device functions are deployed on a satellite, a mobile un-crewed aerial vehicle, a mobile hot air balloon, or the like, to provide seamless coverage for a terminal device. In addition, the NTN system is slightly affected by a natural disaster, to improve reliability of the 5G system.

A network device in the NTN system forwards a signal of a terrestrial base station connected to the network device to the ground, to form a corresponding cell. Because the network device in the NTN system is mobile, the terrestrial base station connected to the network device also changes. Signals sent by the network device vary with terrestrial base stations connected to the network device. As a result, the cell signals forwarded by the network device may hop, that is, cell hopping may occur.

In addition, for a TN system, due to energy saving or other reasons, a cell is powered off at a moment or in a period of time. Consequently, a signal of the cell hops, that is, there is also cell hopping in the TN system.

How a terminal device performs cell reselection in an application scenario of cell hopping needs to be resolved.

SUMMARY

Embodiments of this application provide a cell reselection method and system, and an apparatus, to implement cell reselection in a cell hopping scenario.

According to a first aspect, an embodiment of this application provides a cell reselection method. The method includes: receiving reselection configuration information from a network device, where the reselection configuration information includes reselection trigger information, the reselection trigger information is used to trigger measurement for cell reselection, and the reselection trigger information includes reselection trigger time information or reselection trigger indication information; and performing measurement for cell reselection based on the reselection configuration information.

Based on the foregoing embodiment, the reselection configuration information including the reselection trigger information is introduced. Based on the reselection configuration information, an implementation method for performing cell reselection by a terminal device in a cell hopping scenario is provided, to help avoid a case in which the terminal device cannot perform normal communication.

In some possible implementation methods, the reselection trigger information includes the reselection trigger time information. The performing measurement for cell reselection based on the reselection configuration information includes: starting the measurement for cell reselection at a moment indicated by the reselection trigger time information.

Based on the foregoing embodiment, the reselection trigger time information indicates the moment at which the measurement for cell reselection is started.

In some possible implementation methods, the reselection trigger information includes the reselection trigger indication information. The performing measurement for cell reselection based on the reselection configuration information includes: starting the measurement for cell reselection at a moment when the reselection trigger indication information is obtained.

Based on the foregoing embodiment, the reselection trigger indication information indicates the moment at which the measurement for cell reselection is started.

In some possible implementation methods, the reselection configuration information further includes reselection target information, the reselection target information may be used in combination with the reselection trigger information, and the reselection target information is used to indicate information about a target cell for reselection measurement. The performing measurement for cell reselection based on the reselection configuration information includes: determining, based on the reselection trigger information, to perform measurement; and performing reselection to the target cell if quality of the target cell is available through the measurement and the target cell satisfies a first criterion.

Based on the foregoing embodiment, the reselection target information indicates a measurement target, so that unnecessary reselection measurement can be reduced, and energy consumption of the terminal device can be reduced.

In some possible implementation methods, the reselection configuration information further includes reselection time range information, and the reselection time range information may be used in combination with the reselection target information. The performing reselection to the target cell if quality of the target cell is available through the measurement and the target cell satisfies a first criterion includes: performing reselection to the target cell if quality of the target cell is available through the measurement within a time range indicated by the reselection time range information and the target cell satisfies the first criterion.

Based on the foregoing embodiment, the reselection target information indicates the measurement target, so that the unnecessary reselection measurement can be reduced, and the energy consumption of the terminal device can be reduced. In addition, the reselection time range information indicates the time range within which the reselection is performed, that is, the reselection measurement is performed within a specific time range, so that a quantity of unnecessary reselection measurements is reduced, and the energy consumption of the terminal device can be further reduced.

In some possible implementation methods, the reselection configuration information is carried in a multicast message, a unicast message, downlink control information, an SMS message, a paging message, or a system message.

According to a second aspect, an embodiment of this application provides a cell reselection method. The method includes: receiving non-reselection configuration information and reselection configuration information from a network device; and determining, based on the non-reselection configuration information, whether to perform measurement for cell reselection based on the reselection configuration information. The reselection configuration information includes at least one of reselection trigger information, reselection target information, or reselection time range information.

Based on the foregoing embodiment, the non-reselection configuration information is introduced, so that unnecessary cell reselection of a part of terminal devices is avoided, and energy consumption of a terminal device is reduced.

In some possible implementation methods, the non-reselection configuration information includes non-reselection condition information, where the non-reselection condition information includes information about a measurement target cell. The determining, based on the non-reselection configuration information, whether to perform measurement for cell reselection based on the reselection configuration information includes: determining not to perform measurement for cell reselection based on the reselection configuration information if quality of the measurement target cell is available through measurement.

Based on the foregoing embodiment, the measurement target cell is given. If quality of the measurement target cell is available through the measurement, cell reselection is not performed, that is, the terminal device camps on a current serving cell. This can reduce unnecessary measurement and reduce the power consumption of the terminal device.

In some possible implementation methods, the non-reselection condition information further includes a quality threshold. The determining not to perform measurement for cell reselection based on the reselection configuration information if quality of the measurement target cell is available through measurement includes: determining not to perform measurement for cell reselection based on the reselection configuration information if quality of the measurement target cell is available through the measurement and quality of the measurement target cell is higher than the quality threshold.

In some possible implementation methods, the non-reselection configuration information includes non-reselection area information. The determining, based on the non-reselection configuration information, whether to perform measurement for cell reselection based on the reselection configuration information includes: determining not to perform measurement for cell reselection based on the reselection configuration information if the terminal device is located in an area indicated by the non-reselection area information.

Based on the foregoing embodiment, the non-reselection area information is given. When the terminal device is in the non-reselection area, the cell reselection is not performed, that is, the terminal device camps on a current serving cell. This can reduce unnecessary measurement and reduce the power consumption of the terminal device.

In some possible implementation methods, the non-reselection configuration information includes non-reselection time range information. The determining, based on the non-reselection configuration information, whether to perform measurement for cell reselection based on the reselection configuration information includes: determining not to perform measurement for cell reselection based on the reselection configuration information within a non-reselection time range.

Based on the foregoing embodiment, the non-reselection time range information is given. Cell reselection is not performed within the non-reselection time range, that is, the terminal device camps on a current serving cell. This can reduce unnecessary measurement and reduce the power consumption of the terminal device.

In some possible implementation methods, after determining not to perform measurement for cell reselection based on the reselection configuration information, the measurement for cell reselection is not performed.

In some possible implementation methods, after determining not to perform measurement for cell reselection based on the reselection configuration information, the measurement for cell reselection is performed based on reselection priority configuration information of a neighboring cell of a serving cell, where the reselection priority configuration information includes dedicated reselection priority configuration information and/or common reselection priority configuration information.

In some possible implementation methods, after determining to perform measurement for cell reselection based on the reselection configuration information, the measurement for cell reselection is performed based on the reselection configuration information.

In some possible implementation methods, the reselection configuration information includes the reselection trigger information, the reselection trigger information is used to trigger the measurement for cell reselection, and the reselection trigger information includes reselection trigger time information or reselection trigger indication information.

In some possible implementation methods, the reselection trigger information includes the reselection trigger time information. The performing measurement for cell reselection based on the reselection configuration information includes: starting the measurement for cell reselection at a moment indicated by the reselection trigger time information.

In some possible implementation methods, the reselection trigger information includes the reselection trigger indication information. The performing measurement for cell reselection based on the reselection configuration information includes: starting the measurement for cell reselection at a moment when the reselection trigger indication information is obtained.

In some possible implementation methods, the reselection configuration information further includes the reselection target information, and the reselection target information is used to indicate information about a target cell for reselection measurement. The performing measurement for cell reselection based on the reselection configuration information includes: determining, based on the reselection trigger information, to perform measurement; and performing reselection to quality of the target cell if the target cell is available through the measurement and the target cell satisfies a first criterion.

In some possible implementation methods, the reselection configuration information further includes the reselection time range information. The performing reselection to the target cell if quality of the target cell is available through the measurement and the target cell satisfies a first criterion includes: performing reselection to the target cell if quality of the target cell is available through the measurement within a time range indicated by the reselection time range information and the target cell satisfies the first criterion.

In some possible implementation methods, the reselection configuration information and the non-reselection configuration information may be separately carried in a multicast message, a unicast message, downlink control information, an SMS message, a paging message, or a system message.

According to a third aspect, an embodiment of this application provides a cell reselection method. The method includes: receiving cell reselection indication information of a serving cell from a network device, where the cell reselection indication information is used to indicate that the serving cell is a hopping cell; performing cell measurement based on the cell reselection indication information, and obtaining, through the measurement, at least one candidate cell that satisfies a first criterion; and determining to reselect to and camp on a target cell, where the target cell is a non-hopping cell in the at least one candidate cell, and the target cell is a suitable cell.

Based on the foregoing embodiment, before cell hopping occurs, the network device indicates a terminal device to reselect to another non-hopping cell or camp on a current serving cell. This helps avoid impact of the cell hopping on a service of the terminal device, and ensures service experience of the terminal device. In addition, this helps avoid an increase in energy consumption of the terminal device caused by unnecessary reselection.

In some possible implementation methods, the cell reselection indication information is carried in a multicast message, a unicast message, downlink control information, an SMS message, a paging message, or a system message.

According to a fourth aspect, an embodiment of this application provides a cell reselection method. The method includes: determining reselection configuration information, where the reselection configuration information includes one or more of reselection trigger information, reselection target information, reselection time range information, and cell reselection indication information; the reselection trigger information is used to trigger measurement for cell reselection; the reselection trigger information includes reselection trigger time information or reselection trigger indication information; the reselection target information is used to indicate information about a target cell for reselection measurement; the reselection time range information is used to indicate a time range within which the target cell is measured; and the cell reselection indication information is used to indicate that a serving cell of a terminal device is a hopping cell; and sending the reselection configuration information to the terminal device, where the reselection configuration information is used by the terminal device to perform measurement for cell reselection.

Based on the foregoing embodiment, the reselection configuration information is introduced, so that the terminal device can perform cell reselection in a cell hopping scenario. This avoids an exception that the terminal device is out of a service area, reduces unnecessary reselection measurement, and reduces energy consumption of the terminal device.

In some possible implementation methods, non-reselection configuration information may be sent to the terminal device, where the non-reselection configuration information is used by the terminal device to determine whether to perform measurement for cell reselection based on the reselection configuration information. The non-reselection configuration information includes one or more of non-reselection condition information, a quality threshold, non-reselection area information, and non-reselection time range information. The non-reselection condition information includes information about a measurement target cell.

According to a fifth aspect, an embodiment of this application provides a communication apparatus. The apparatus may be a terminal device, or may be a chip used in the terminal device. The apparatus has functions of implementing the first aspect, the second aspect, the third aspect, the embodiments of the first aspect, the embodiments of the second aspect, or the embodiments of the third aspect. The functions may be implemented by hardware, or may be implemented by hardware executing corresponding software. The hardware or the software includes one or more modules corresponding to the foregoing functions.

According to a sixth aspect, an embodiment of this application provides a communication apparatus. The apparatus may be a network device, or may be a chip used in the network device. The apparatus has functions of implementing the fourth aspect or the embodiments of the fourth aspect. The functions may be implemented by hardware, or may be implemented by hardware executing corresponding software. The hardware or the software includes one or more modules corresponding to the foregoing functions.

According to a seventh aspect, an embodiment of this application provides a communication apparatus. The apparatus includes a processor and a memory. The memory is configured to store computer-executable instructions. When the apparatus runs, the processor executes the computer-executable instructions stored in the memory, to enable the apparatus to perform the methods according to the first aspect to the fourth aspect or the embodiments of the first aspect to the fourth aspect.

According to an eighth aspect, an embodiment of this application provides a communication apparatus. The apparatus includes units or means configured to perform the steps in the first aspect to the fourth aspect or the embodiments of the first aspect to the fourth aspect.

According to a ninth aspect, an embodiment of this application provides a communication apparatus. The apparatus includes a processor and an interface circuit. The processor is configured to: communicate with another apparatus or module through the interface circuit, and perform the methods according to the first aspect to the fourth aspect or the embodiments of the first aspect to the fourth aspect. There are one or more processors. Optionally, the apparatus may further include a memory, and the memory may be configured to store instructions and/or data.

According to a tenth aspect, an embodiment of this application provides a communication apparatus. The apparatus includes a processor, where the processor is configured to: be connected to a memory, and invoke a program stored in the memory, to perform the methods according to the first aspect to the fourth aspect or the embodiments of the first aspect to the fourth aspect. The memory may be located inside the apparatus, or may be located outside the apparatus. In addition, there are one or more processors.

According to an eleventh aspect, an embodiment of this application further provides a computer-readable storage medium. The computer-readable storage medium stores instructions. When the instructions are run on a computer, the methods according to the first aspect to the fourth aspect or the embodiments of the first aspect to the fourth aspect are performed.

According to a twelfth aspect, an embodiment of this application further provides a computer program product including instructions. When the computer program product runs on a computer, the computer is enabled to perform the methods according to the first aspect to the fourth aspect or the embodiments of the first aspect to the fourth aspect.

According to a thirteenth aspect, an embodiment of this application further provides a chip system. The chip system includes a processor, configured to perform the methods according to the first aspect to the fourth aspect or the embodiments of the first aspect to the fourth aspect.

According to a fourteenth aspect, an embodiment of this application further provides a communication system. The system includes a terminal device and a network device. The network device is configured to send reselection configuration information to the terminal device, where the reselection configuration information includes reselection trigger information, the reselection trigger information is used to trigger measurement for cell reselection, and the reselection trigger information includes reselection trigger time information or reselection trigger indication information. The terminal device is configured to perform measurement for cell reselection based on the reselection configuration information.

According to a fifteenth aspect, an embodiment of this application further provides a communication system. The system includes a terminal device and a network device. The network device is configured to send reselection configuration information and non-reselection configuration information to the terminal device, where the reselection configuration information includes reselection trigger information, the reselection trigger information is used to trigger measurement for cell reselection, and the reselection trigger information includes reselection trigger time information or reselection trigger indication information. The terminal device is configured to determine, based on the non-reselection configuration information, whether to perform measurement for cell reselection based on the reselection configuration information.

According to a sixteenth aspect, an embodiment of this application provides a cell reselection system. The system includes a terminal device and a network device. The network device is configured to send cell reselection indication information of a serving cell of the terminal device to the terminal device, where the cell reselection indication information is used to indicate that the serving cell is a hopping cell. The terminal device is configured to: perform cell measurement based on the cell reselection indication information, and obtain, through the measurement, at least one candidate cell that satisfies a first criterion; and determine to reselect to and camp on a target cell, where the target cell is a non-hopping cell in the at least one candidate cell, and the target cell is a suitable cell.

According to a seventeenth aspect, an embodiment of this application further provides a communication method. The method includes: sending, by a network device, reselection configuration information to a terminal device, where the reselection configuration information includes reselection trigger information, the reselection trigger information is used to trigger measurement for cell reselection, and the reselection trigger information includes reselection trigger time information or reselection trigger indication information; and performing, by the terminal device, measurement for cell reselection based on the reselection configuration information.

According to an eighteenth aspect, an embodiment of this application further provides a communication method. The method includes: sending, by a network device, reselection configuration information and non-reselection configuration information to a terminal device, where the reselection configuration information includes reselection trigger information, the reselection trigger information is used to trigger measurement for cell reselection, and the reselection trigger information includes reselection trigger time information or reselection trigger indication information; and determining, by the terminal device based on the non-reselection configuration information, whether to perform measurement for cell reselection based on the reselection configuration information.

According to a nineteenth aspect, an embodiment of this application provides a cell reselection method. The method includes: sending, by a network device, cell reselection indication information of a serving cell of a terminal device to the terminal device, where the cell reselection indication information is used to indicate that the serving cell is a hopping cell; performing, by the terminal device, cell measurement based on the cell reselection indication information, and obtaining, through the measurement, at least one candidate cell that satisfies a first criterion; and determining, by the terminal device, to reselect to and camp on a target cell, where the target cell is a non-hopping cell in the at least one candidate cell, and the target cell is a suitable cell.

DETAILED DESCRIPTION OF ILLUSTRATIVE EMBODIMENTS

Figure 1:
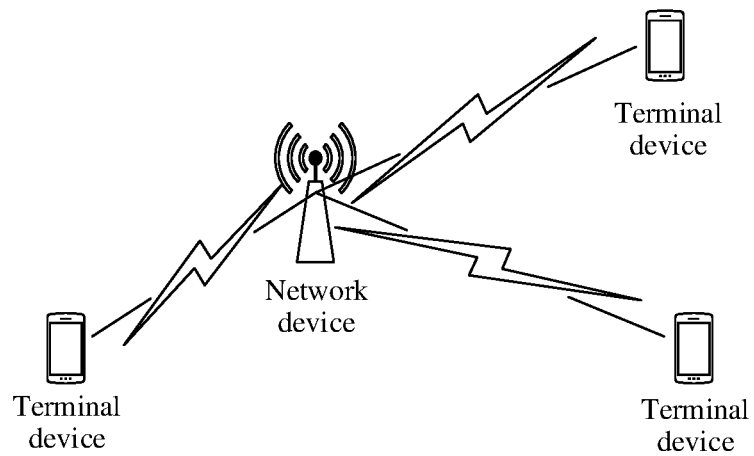
FIG. 1 is a schematic diagram of a network architecture to which this application is applicable.

FIG. 1 is a schematic diagram of a network architecture to which an embodiment this application is applicable. The network architecture includes a terminal device and a network device. The network device is deployed in an NTN system, for example, deployed on a satellite, a mobile uncrewed aerial vehicle, or a mobile hot air balloon. The terminal device communicates with the network device through a wireless interface.

The terminal device is a device having a wireless transceiver function. The terminal device may be deployed on land, including an indoor or outdoor terminal device, a hand-held terminal device, or a vehicle-mounted terminal device; may be deployed on a water surface (for example, on a ship); or may be deployed in the air (for example, on an airplane, a balloon, or a satellite). The terminal device may be a mobile phone, a tablet (pad), a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, user equipment (UE), or the like.

The network device is a device in a wireless network. For example, the terminal device is connected to a radio access network (RAN) node of the wireless network. Currently, examples of some RAN nodes are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), integrated access and backhaul (IAB) node, or the like. In a network structure, the network device may include a centralized unit (CU) node, a distributed unit (DU) node, or a RAN device including the CU node and the DU node. In a network structure, the centralized unit CU node may be divided into a control plane (CU-CP) and a user plane (CU-UP). The CU-CP is responsible for a control plane function, and mainly includes radio resource control (RRC) and a packet data convergence protocol (PDCP)-C. The PDCP-C is mainly responsible for data encryption and decryption, integrity protection, data transmission, and the like on a control plane. The CU-UP is responsible for a user plane function, and mainly includes a service data adaptation protocol (SDAP) and a PDCP-U. The SDAP is mainly responsible for processing data of a core network and mapping a flow to a bearer. The PDCP-U is mainly responsible for encryption and decryption, integrity protection, header compression, serial number maintenance, data transmission, and the like on a data plane. The CU-CP is connected to the CU-UP through an E1 interface. The CU-CP indicates that the CU is connected to the core network through an Ng interface. The CU-CP is connected to the DU through F1-C (a control plane). The CU-UP is connected to the DU through F1-U (a user plane). Certainly, in another possible implementation, the PDCP-C is on the CU-UP.

The network device in embodiments of this application may be a network device in the NTN system (for example, a satellite communication system, a high altitude platform communication system, or another non-terrestrial communication system), or may be a network device in a TN. For ease of description, the following embodiments of this application are described by using an example in which the network device is deployed on the satellite. In addition, for ease of description, the "network device on the satellite" is hereinafter replaced with the "satellite" in embodiments of this application. In other words, communication between the terminal device and the satellite described in the following embodiments of this application actually refers to communication between the terminal device and the network device on the satellite. Unified descriptions are provided herein, and details are not described below again.

A satellite system can be classified into the following three types based on a satellite height, namely, a satellite orbit height:

(1) High-earth orbit (Geostationary-Earth Orbit, GEO) satellite: The GEO satellite is also referred to as a geostationary satellite. The satellite moves at a same speed as an earth's rotation system. Therefore, the satellite remains stationary relative to ground. Correspondingly, a cell of the GEO satellite is also stationary. A coverage area of the GEO satellite cell is large. For example, a cell diameter may be 500 km.

(2) Low-earth orbit (LEO) satellite: The satellite, at a speed of about 7 km/s, moves fast relative to ground. Therefore, a service coverage area provided by the LEO satellite also moves.

(3) Medium-earth orbit satellite: The medium-earth orbit satellite is a satellite between a high-earth orbit satellite and a low-earth orbit satellite.

The satellite in embodiments of this application may be the low-earth orbit satellite, or may be expanded to the medium-earth orbit satellite or another mobile network device. For ease of description, the foregoing satellites are hereinafter referred to as satellites for short in embodiments of this application.

The satellite provides a service coverage area in either of the following modes:

The first mode is a transparent forwarding mode. The satellite forwards information about a cell of a terrestrial network device (for example, a base station, and the following uses an example in which the terrestrial network device is a terrestrial base station for description). In the transparent forwarding mode, a satellite cell may be terrestrially fixed or move as the satellite moves. That the satellite cell is terrestrially fixed means that the satellite cell is fixed within a coverage area of the ground. Specifically, the satellite cell may be fixed in a period of time, or may be permanently fixed. That the satellite cell moves as the satellite moves means that when the satellite moves, the cell generated by the satellite also moves on the ground. When the satellite moves, if there is a connection between the satellite and an original base station, a possible manner is that a cell of the original base station follows the satellite for a period of time (that is, the connection is maintained for a period of time). When the satellite is connected to a new base station, the satellite forwards information about a cell of the new base station. In the transparent forwarding mode, the satellite receives a signal from the terrestrial base station and forwards the signal to the ground. In this case, although the satellite keeps running, a position of the terrestrial base station does not change. Therefore, although a cell served by the terrestrial base station forwarded by the satellite moves as the satellite runs, a movement range of the cell is around the base station.

In a possible design, one cell may be identified by using a physical cell identifier (physical cell identifier, PCI) and a frequency, or a cell global identifier (CGI).

A second mode is a regenerative mode, that is, the satellite may generate cell information by itself. For example, the satellite in this mode may include a DU, a base station, an IAB, or a network device with a similar function. In the regenerative mode, a satellite cell may be terrestrially fixed or move as the satellite moves. That the satellite cell is terrestrially fixed means that the satellite cell is fixed within a coverage area of the ground. Specifically, the satellite cell may be fixed in a period of time, or may be permanently fixed. That the satellite cell moves as the satellite moves means that when the satellite moves, the cell generated by the satellite also moves on the ground. When the satellite moves, a possible implementation is that the cell generated by the satellite also moves on the ground. In other words, a network device on the satellite does not dynamically adjust a beam direction, and a beam generated by the network device on the satellite moves on the ground as the satellite moves.

Generally, after the satellite is removed, there is a new satellite, to ensure continuous coverage if possible. A coverage area of the new satellite may be the same as or different from that of the previous satellite. It may be understood that due to different running directions, beam transmitting directions, and beam transmitting capabilities of satellites, ground coverage areas of the two satellites may not be completely the same.

For the satellite in the first mode (namely, the satellite in the transparent forwarding mode), because the satellite is mobile, the satellite forwards the signal of the terrestrial base station connected to the satellite to the ground, to form a corresponding cell. Because signals sent by the satellite vary with terrestrial base stations connected to the satellite, the cell signals forwarded by the satellite may hop. There are two types of hopping, and descriptions are separately provided below.

Hopping mode 1: One satellite may be simultaneously connected to a plurality of (more than one) terrestrial base stations. When the satellite is no longer connected to a base station 1 but is connected to a base station 2, the satellite simultaneously sends a signal of a cell of the base station 1 and a signal of a cell of the base station 2 for a period of time. However, at a moment, the satellite no longer forwards the signal of the cell of the base station 1, that is, the signal of the cell of the base station 1 suddenly disappears in an original coverage area. In embodiments of this application, the cell of the base station 1 may be referred to as a "hopping cell".

Hopping mode 2: One satellite is connected to only one terrestrial base station at a time. When the satellite is no longer connected to a base station 1 but is connected to a base station 2, the satellite forwards a signal of a cell of the base station 2 immediately after the satellite is connected to the base station 2, and is disconnected from the base station 1, so that the satellite does not forward a signal of a cell of the base station 1. That is, the signal of the cell of the base station 1 suddenly disappears in an original coverage area of the satellite, and the signal of the cell of the base station 2 suddenly appears. In embodiments of this application, the cell of the base station 1 may be referred to as a "hopping cell".

The "hopping cell" may be understood as that the cell exists dynamically, that is, a signal of the cell does not exist or disappears in an area after a moment or in a period of time. Optionally, a new cell may provide communication for an original coverage area of the cell.

An NTN system is used as an example in embodiments of this application. It may be understood that embodiments of this application are also applicable to a TN system. For example, in the TN system, due to energy saving or other reasons, a cell is powered off at a moment or in a period of time, and the powered-off cell may also be considered as a "hopping cell".

Figure 2A:
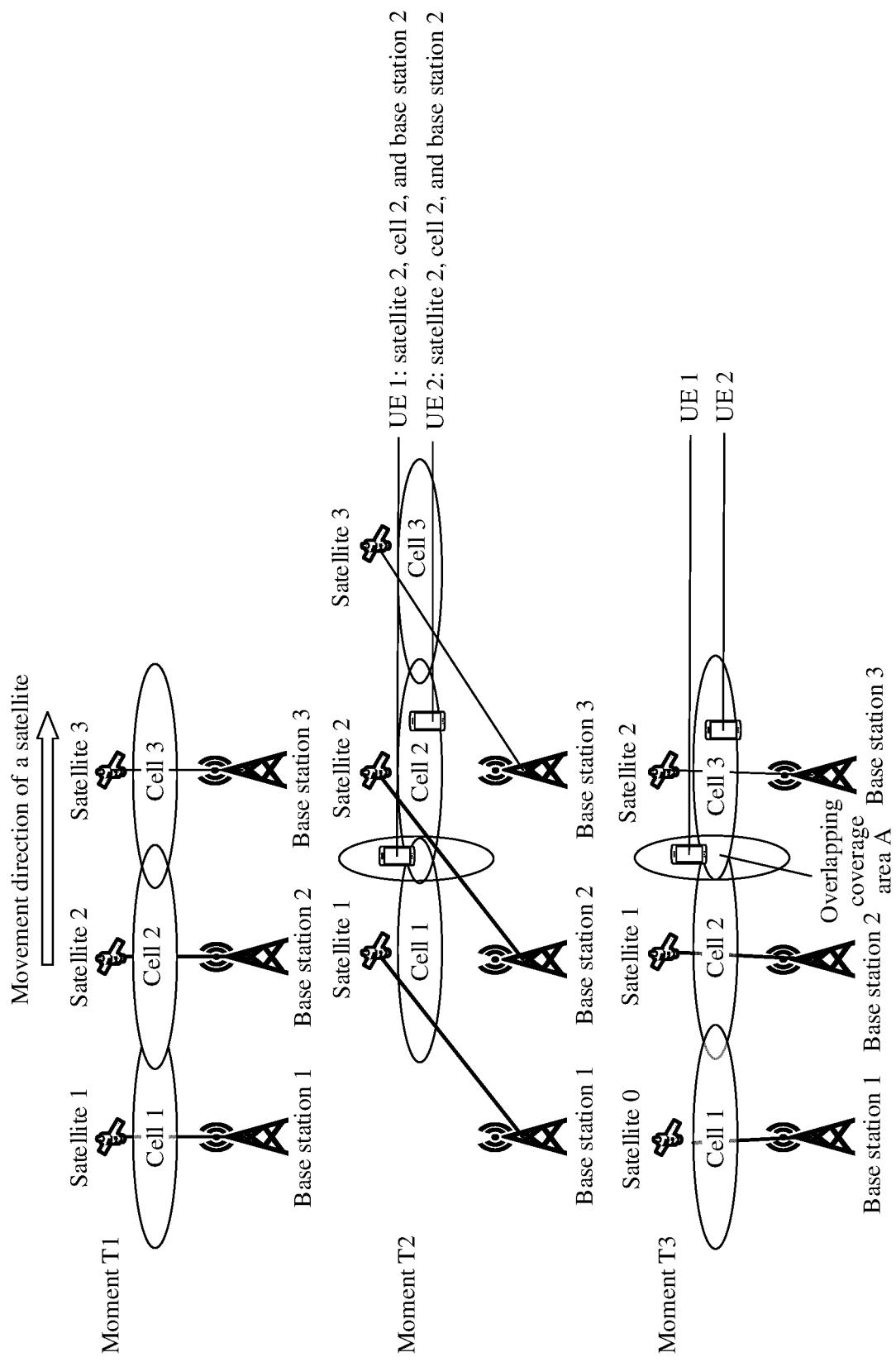
FIG. 2A is an example diagram of hopping of a cell served by a satellite.

Regardless of how cell information of the satellite changes, cell information corresponding to some areas may not change. FIG. 2A is an example diagram of hopping of a cell served by a satellite. In this example, a satellite 1 and a satellite 2 support forwarding of a signal of a cell of only one base station. In the figure, an example in which the satellite moves from left to right is used.

Moment T1: The satellite 1 is connected to a base station 1 and forwards a signal of a cell 1 of the base station 1; the satellite 2 is connected to a base station 2 and forwards a signal of a cell 2 of the base station 2; a satellite 3 is connected to a base station 3 and forwards a signal of a cell 3 of the base station 3.

Moment T2 (a moment before cell hopping occurs): The satellite 1 is connected to the base station 1 and forwards the signal of the cell 1 of the base station 1; the satellite 2 is connected to the base station 2 and forwards the signal of the cell 2 of the base station 2; the satellite 3 is connected to the base station 3 and forwards the signal of the cell 3 of the base station 3.

Compared with the moment T1, at the moment T2, the cell moves as the satellite moves, but the cell hopping has not occurred.

As the satellite moves rightwards, the satellite 1 is disconnected from the base station 1 and is connected to the base station 2, and the satellite 2 is disconnected from the base station 2 and is connected to the base station 3.

Moment T3 (a moment when the cell hopping occurs or after the cell hopping occurs): A satellite 0 is connected to the base station 1 and forwards the signal of the cell 1 of the base station 1; the satellite 1 is connected to the base station 2 and forwards the signal of the cell 2 of the base station 2; the satellite 2 is connected to the base station 3 and forwards the signal of the cell 3 of the base station 3.

It can be learned from FIG. 2A that, before the hopping, an area is covered by the cell 1 and the cell 2; after the hopping, the area is covered by the cell 2 and the cell 3. In other words, before the hopping, the satellite 1 is connected to the base station 1 and forwards the signal of the cell 1 of the base station 1, and the satellite 2 is connected to the base station 2 and forwards the signal of the cell 2 of the base station 2; after the hopping, the satellite 1 is connected to the base station 2 and forwards the signal of the cell 2 of the base station 2, and the satellite 2 is connected to the base station 3 and forwards the signal of the cell 3 of the base station 3.

In addition, when there is the overlapping coverage area of the cell 1 and the cell 2 before the hopping (for example, at the moment T2), the signal of the cell 2 always exists in the area before and after the hopping. For example, refer to FIG. 2A. At the moment T2, UE 1 is located in the overlapping coverage area of the cell 1 and the cell 2, and both the signals of the cell 1 and the cell 2 exist in the area. At the moment T3, because the satellite moves, assuming that the UE 1 does not move or does not move out of the overlapping coverage area, the UE 1 is located in the overlapping coverage area of the cell 2 and the cell 3, and both the signals of the cell 2 and the cell 3 exist in the area. Therefore, it can be learned that the signal of the cell 2 always exists in the overlapping coverage area before and after the hopping. If UE (for example, the UE 1 in FIG. 2A) in an overlapping coverage area performs reselection to the cell 3 after the hopping, as the satellite continues to move, the UE needs to reselect back to the previous cell 2 from the cell 3. Consequently, the UE frequently changes a camped cell, and power consumption of the UE is increased.

In conclusion, how the UE performs cell reselection in an application scenario of the cell hopping is a problem to be resolved in embodiments of this application.

Figure 3:
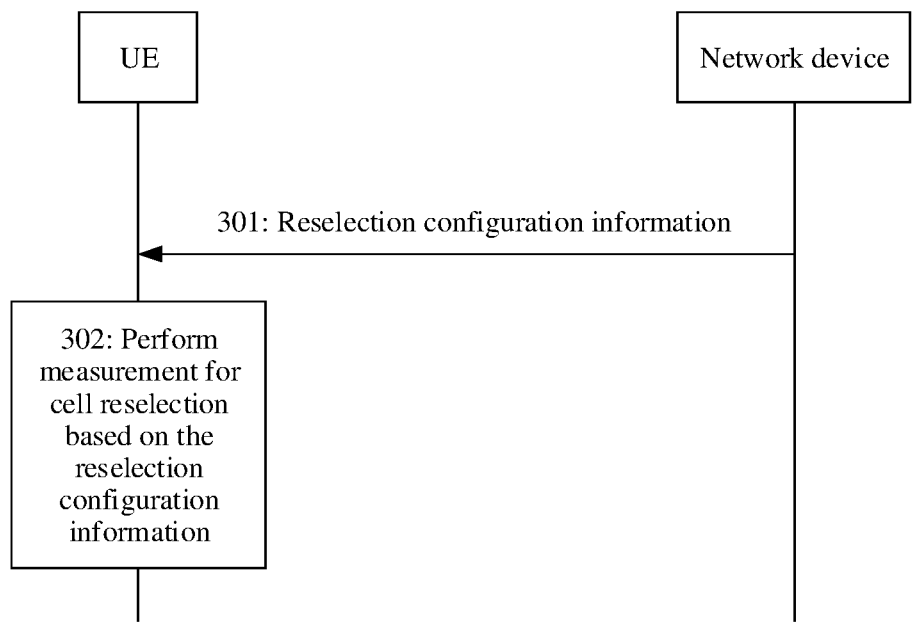
FIG. 3 is a schematic diagram of a cell reselection method according to an embodiment of this application.

As shown in FIG. 3, an embodiment of this application provides a cell reselection method. The method may be applied to a cell hopping scenario. On a UE side, the method may be performed by UE or a component (for example, a chip or a circuit) used in the UE. On a network side, the method may be performed by a network device (which may be a RAN device, a DU, or a CU) or a component (for example, a chip or a circuit) used in the network device. For ease of description, an example in which the method is performed by the UE and the network device is used below for description.

The method includes the following steps.

Step 301: The network device sends reselection configuration information to the UE.

Accordingly, the UE may receive the reselection configuration information.

When the network device is deployed on a satellite, and for example, the satellite is in a transparent forwarding mode, the network device may receive the reselection configuration information from a base station in a TN, and forward the reselection configuration information to the UE.

The reselection configuration information includes configuration information used for reselection. The reselection configuration information may include at least one of reselection trigger information or reselection target information. Optionally, the reselection configuration information may further include reselection time range information.

Optionally, the reselection configuration information may be carried in any one of a system message, a paging message, a multicast message, a unicast message, an SMS message, and downlink control information. The reselection trigger information is used to trigger the UE to perform measurement for cell reselection. That is, when the UE satisfies the reselection trigger information, regardless of whether quality of a serving cell of the UE satisfies a reselection condition, the UE performs measurement for cell reselection. The reselection trigger information may include reselection trigger time information or reselection trigger indication information.

The reselection trigger time information is used to indicate the UE to immediately perform measurement for a cell reselection process when reselection trigger time arrives. The "reselection trigger time information" may be expressed in a plurality of manners. For example, the reselection trigger time information may be absolute time (for example, at least one of coordinated universal time (UTC), a global positioning system (GPS) clock, a system frame number (SFN) broadcast by a network, or other time information); and/or, the reselection trigger time information may be relative time (for example, at least one of a GPS clock count offset, a relative SFN offset that uses an SFN broadcast by a network as a reference, or other time information). In an implementation, when the reselection trigger time information includes the absolute time and the relative time, the UE may determine the reselection trigger time based on the absolute time and the relative time.

The reselection trigger indication information is used to indicate the UE to immediately perform measurement for cell reselection. The reselection trigger indication information may also be referred to as a reselection trigger command or a reselection trigger instruction. For example, at least one bit may be used to trigger the UE to immediately perform measurement for cell reselection. In an implementation, based on the reselection trigger indication information, the UE may immediately perform measurement based on reselection priority configuration information of a neighboring cell of the serving cell. The reselection priority configuration information may include, for example, one or more of frequency information, frequency priority information, and information about a PCI on a frequency. The neighboring cell of the serving cell includes one or more of an intra-frequency neighboring cell, an inter-frequency neighboring cell, and an inter-system neighboring cell. The reselection priority configuration information may include dedicated reselection priority configuration information and/or common reselection priority configuration information. The reselection priority configuration information sent by using dedicated signaling may be referred to as the dedicated reselection priority configuration information, and the reselection priority configuration information sent by using a system message may be referred to as the common reselection priority configuration information. It may be understood that, in this embodiment of this application, the reselection configuration information and the reselection priority configuration information may be sent to the UE by using different messages or through different signaling processes, or the reselection configuration information and the reselection priority configuration information may be sent to the UE by using one message.

It may be understood that "the UE performs measurement" may include: The UE performs at least one of measurement on a current cell, intra-frequency measurement, inter-frequency measurement, or inter-system measurement. Alternatively, "the UE performs measurement" may be understood as that the UE performs measurement for cell reselection. Optionally, in a possible manner, the UE may periodically perform measurement on the serving cell. In addition, "the UE does not perform measurement" may be understood as that the UE does not perform measurement for cell reselection.

The reselection target information is used to indicate information about a target cell for reselection measurement; or the reselection target information is used to trigger the UE to perform measurement for cell reselection based on information about a target cell. The reselection target information may be a frequency of the target cell, or a frequency and a physical cell identifier of the target cell. Optionally, the reselection target information may be further used to indicate that the target cell has a highest priority. It may be understood that, when the reselection target information exists, "the UE performs measurement" may include at least "the UE performs measurement based on the information about the target cell".

The reselection time range information is used to indicate that the UE may perform measurement for cell reselection based on the reselection trigger information and/or the reselection target information within a time range. The reselection time range information may include a time length, or start time information and a time length, or start time information and end time information, or end time information. The UE may ignore the reselection trigger information and/or the reselection target information beyond the time range indicated by the reselection time range information. For example, the UE may perform measurement for cell reselection based on the reselection priority configuration information described above. To be specific, the reselection time range information limits effective time of the reselection trigger information and/or the reselection target information. Within the time range indicated by the reselection time range information, the reselection trigger information and/or the reselection target information is valid. However, beyond the time range indicated by the reselection time range information, the reselection trigger information and/or the reselection target information is invalid, for example, the UE may ignore the reselection trigger information and/or the reselection target information. In a possible manner, when the reselection trigger information and/or the reselection target information is invalid, the UE performs measurement for cell reselection according to a normal process or rule (that is, the UE performs a conventional cell reselection process). For example, for the conventional cell reselection process, refer to a corresponding section in TS38.304 v15.4.0 or TS36.304 v15.4.0.

Step 302: The UE performs measurement for cell reselection based on the reselection configuration information.

For example, the reselection configuration information includes at least the reselection target information (where for example, the reselection target information may be the frequency of the target cell, or the frequency and the physical cell identifier of the target cell). The UE may perform measurement for cell reselection on the target cell based on the reselection target information. In other words, when the reselection target information exists, the UE may perform measurement based only on the reselection target information, that is, may ignore the reselection priority configuration information. If the UE obtains, through the measurement, the target cell indicated by the reselection target information, or the UE obtains, through the measurement, the target cell indicated by the reselection target information and quality of the target cell satisfies a first quality condition, the UE performs cell reselection to the target cell. If the UE cannot obtain, through the measurement, the target cell indicated by the reselection target information, or the UE obtains, through the measurement, the target cell indicated by the reselection target information but quality of the target cell does not satisfy a first quality condition, the UE cannot perform cell reselection to the target cell. In this case, the UE may perform cell reselection based on the reselection priority configuration information, that is, in this case, the UE performs measurement for cell reselection according to the normal process or rule.

In this embodiment of this application, quality of a cell (for example, the target cell) includes at least one of received signal code power (RSCP), reference signal received power (RSRP), reference signal received quality (RSRQ), a signal-to-noise ratio (SNR), a signal to interference plus noise ratio (SINR), a reference signal strength indication (RSSI), or other signal quality. The quality of the cell may be at a cell level, a beam level, a synchronization signal/physical broadcast channel block level, an air interface technology (numerology) level, a slicing level, or a bandwidth part (BWP) level. Downlink signal quality may be obtained by measuring at least one of a downlink synchronization channel, a channel state information reference signal (Channel State Information (CSI) reference signal, CSI-RS), a demodulation reference signal (DMRS), a cell-specific reference signal (CRS), a synchronization signal (SS), a synchronization signal/physical broadcast channel block (SS/PBCH Block), or other downlink signals. In correspondence to the quality of the cell, a reference threshold for the quality of the cell may include at least one of an RSCP threshold, an RSRP threshold, an RSRQ threshold, an SNR threshold, an SINR threshold, an RSSI threshold, or other quality thresholds.

A beam may be understood as a spatial resource, and may be a transmit or receive precoding vector having energy transmission directivity. In addition, the transmit or receive precoding vector can be identified by using index information, and the index information may be a correspondingly configured resource identifier (identity, ID) of a terminal. For example, the index information may be a correspondingly configured identifier or resource of a CSI-RS, or may be a correspondingly configured identifier or resource of an SSB, or may be a correspondingly configured identifier or resource of an uplink sounding reference signal (Sounding Reference Signal, SRS). Optionally, the index information may alternatively be index information explicitly or implicitly carried by a signal or a channel that is carried by the beam. The energy transmission directivity may mean that the precoding vector is used to perform precoding processing on a signal that needs to be sent, so that the signal obtained through the precoding processing has specific spatial directivity; a received signal obtained through the precoding processing performed by using the precoding vector has good received power, for example, satisfies a received demodulation signal-to-noise ratio. The energy transmission directivity may also mean that same signals that are sent from different spatial positions and received by using the precoding vector have different received power.

Alternatively, the reselection target information may be used to indicate that the target cell has a highest priority, a highest quality ranking, or best quality. In a possible implementation, if the UE obtains the target cell through the measurement, the UE performs reselection to the target cell; or if the UE considers that quality of the target cell is the best, the UE performs reselection to the target cell. That is, the UE determines, based on the reselection target information, to preferentially perform reselection to the target cell. Therefore, when the UE obtains the target cell through the measurement, the UE performs reselection to the target cell.

It may be understood that in this embodiment of this application, the cell with the "best quality" may be a cell with a maximum ranking value or a highest ranking in candidate cells, or may be a cell that has a largest quantity of good beams (for example, beams whose beam quality exceeds a threshold) in second cells. The second cells include the cell with the maximum ranking value and a cell having a ranking value whose difference value from the maximum ranking value is within a specified range (for example, x dB, where x is configurable). The ranking value may be understood as a quality result determined based on measurement quality of the cell.

For example, the reselection configuration information includes at least the reselection time range information. The UE may start a timer based on the reselection time range information. For example, if the reselection time range information includes the time length, the UE may start the timer after receiving the reselection configuration information, or start the timer after the reselection trigger time arrives. Therefore, an effective time range of the timer is from a start moment of the timer to the start moment of the timer+the time length. For another example, if the reselection time range information includes the start time information and the end time information, the UE starts the timer at a moment indicated by the start time information, and stops the timer at a moment indicated by the end time information. Therefore, an effective time range of the timer is from the start moment to the end moment.

For example, the reselection configuration information includes at least the reselection trigger time information. When the moment indicated by the reselection trigger time information arrives, the UE immediately performs measurement for the cell reselection process.

For example, the reselection configuration information includes at least the reselection trigger time information and the reselection time range information. The reselection time range information indicates one time length. When the moment indicated by the reselection trigger time information arrives, the UE starts a timer, and sets a time length of the timer as the time length indicated by the reselection time range information. When the timer starts, the UE immediately performs measurement for the cell reselection process. When the timer stops, the UE may determine, based on the quality of the serving cell, whether to perform measurement for cell reselection.

In an implementation, the UE may perform cell reselection based on the reselection configuration information within running time of the timer. Within the running time of the timer, if the UE performs reselection to another cell, the UE may stop the timer. If the timer expires and the UE does not perform reselection to another cell, optionally, the UE may perform cell reselection based on the reselection priority configuration information described above. In this case, optionally, the UE may delete the reselection configuration information. In another implementation, if the reselection configuration information includes the reselection target information, the UE may perform measurement preferentially based on the reselection target information within running time of the timer. If the UE performs reselection to the target cell indicated by the reselection target information, the UE stops the timer. If the UE cannot perform reselection to the target cell within the running time of the timer, the UE may perform measurement based on the reselection priority configuration information described above. In still another implementation, within running time of the timer, the UE performs cell reselection based on both the reselection target information and the reselection priority configuration information described above. For example, when the UE obtains a plurality of reselection candidate cells through the measurement, if the target cell indicated by the reselection target information is included, the UE performs reselection to the target cell; or if the UE considers that the quality of the target cell is the best, the UE performs reselection to the target cell; or the UE performs reselection to a cell with best quality. In yet another implementation, within running time of the timer, the UE performs, based only on the reselection target information, measurement on the target cell indicated by the reselection target information. If the UE cannot perform reselection to the target cell within the running time of the timer, after the timer expires, the UE may perform measurement based on the reselection priority configuration information described above. In yet still another implementation, if the reselection configuration information does not include the reselection target information, within running time of the timer, the UE may perform measurement for cell reselection based on the reselection priority configuration information described above. That is, regardless of whether the quality of the serving cell of the UE satisfies a reselection condition, within the running time of the timer, the UE performs measurement based on the reselection priority configuration information described above.

In an implementation, when the UE performs cell reselection to another cell, the UE may discard the reselection configuration information.

In a specific implementation, an example in which the reselection configuration information includes the reselection trigger time information, the reselection target information, and the reselection time range information, and the network device is a network device on the satellite in the transparent forwarding mode is used for description. Refer to FIG. 2A. At a moment before the moment T2, the base station 2 determines reselection configuration information, and the reselection configuration information includes:

reselection trigger time information: T2;

reselection target information: a frequency and a PCI of the cell 3; and reselection time range information: time period information, where for example, a length of a time period is T2 to T3.

The base station 2 sends the reselection configuration information to UEs (including the UE 1 and UE 2) in the cell 2. For example, the base station 2 may send the reselection configuration information to UE through a network device on the satellite 2 connected to the base station 2. The UE 1 and the UE 2 perform an operation related to cell reselection based on the reselection configuration information.

For example, the network device on the satellite 2 or the base station 2 sends the reselection configuration information to UE at any moment before the moment T2. For example, when the moment T2 arrives, if the UE 1 and the UE 2 obtain quality of the cell 3 through measurement based only on the reselection target information within a time range from T2 to T3, and the quality of the cell 3 satisfies a first criterion, the UE 1 and the UE 2 perform reselection to the cell 3.

For another example, due to signal blockage or other reasons, the UE 1 does not obtain quality of the cell 3 through measurement within a time range from T2 to T3. In this case, the UE 1 may perform measurement based on reselection priority configuration information within the time range from T2 to T3, and also perform measurement based on the reselection priority configuration information beyond the time range from T2 to T3. In a possible implementation, that the UE 1 performs measurement based on the reselection priority configuration information may be that the UE 1 determines, according to a cell reselection mechanism in a conventional technology, a target cell that is to be reselected to (for example, reference may be made to related descriptions in 3GPP TS38.304 v15.4.0). For example, if the UE 1 obtains, through the measurement, a plurality of cells that satisfy a quality condition, the UE 1 may perform cell reselection based on a frequency priority, for example, attempt to perform reselection to a cell with best quality in cells with a highest frequency priority. The frequency priority herein is an example of the reselection priority configuration information.

Based on the foregoing embodiment, the reselection configuration information including the reselection trigger information is introduced. Based on the reselection configuration information, an implementation method for performing cell reselection by the UE in the cell hopping scenario is provided, to help avoid a case in which the UE cannot perform normal communication. Further, when the reselection configuration information includes the reselection target information, unnecessary reselection measurement can be reduced, and energy consumption of the UE can be reduced. When the reselection configuration information includes the reselection time range information, a quantity of reselection measurements can be reduced, and the energy consumption of the UE can be further reduced.

Figure 4:
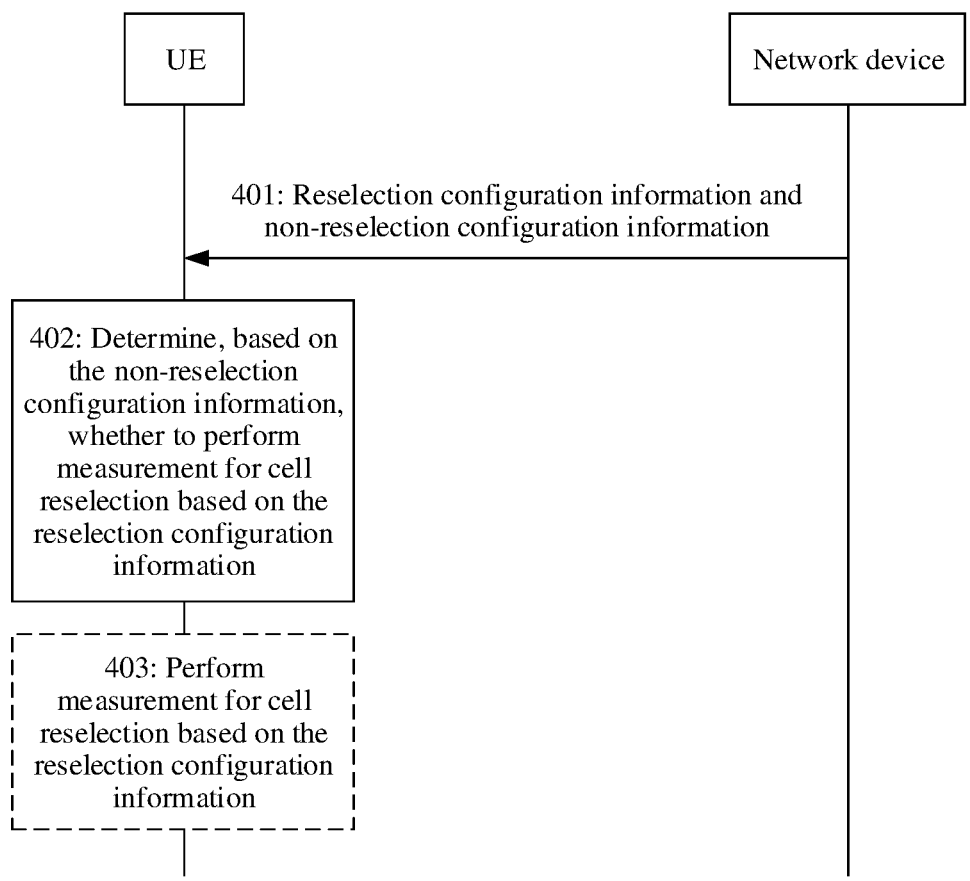
FIG. 4 is a schematic diagram of another cell reselection method according to an embodiment of this application.

As shown in FIG. 4, an embodiment of this application provides another cell reselection method. The method may be applied to a scenario in which hopping is triggered, or may be applied to a scenario after hopping occurs. On a UE side, the method may be performed by UE or a component (for example, a chip or a circuit) used in the UE. On a network side, the method may be performed by a network device (which may be a RAN device, a DU, or a CU) or a component (for example, a chip or a circuit) used in the network device. For ease of description, an example in which the method is performed by the UE and the network device is used below for description.

The method includes the following steps.

Step 401: The network device sends reselection configuration information and non-reselection configuration information to the UE.

Accordingly, the UE may receive the reselection configuration information and the non-reselection configuration information.

The reselection configuration information includes at least one of reselection trigger information, reselection target information, or reselection time range information. For specific descriptions of the reselection trigger information, the reselection target information, and the reselection time range information, refer to the related descriptions in the embodiment corresponding to FIG. 3. When the network device is deployed on a satellite, and for example, the satellite is in a transparent forwarding mode, the network device may receive the reselection configuration information from a base station in a TN, and forward the reselection configuration information to the UE.

It may be understood that the reselection configuration information and the non-reselection configuration information may be carried in a same message, or may be carried in different messages. Optionally, the reselection configuration information and the non-reselection configuration information may be separately carried in any one of a system message, a paging message, a multicast message, a unicast message, an SMS message, and downlink control information.

For a specific implementation of the reselection configuration information, refer to the descriptions in the embodiment corresponding to FIG. 3. Details are not described herein again.

The non-reselection configuration information includes at least one of non-reselection condition information or non-reselection area information. Optionally, the non-reselection configuration information may further include non-reselection time range information. It may be understood that the non-reselection configuration information may also be referred to as reselection configuration deactivation information.

If the UE determines that the UE satisfies the non-reselection configuration information, the UE may not perform measurement based on the reselection configuration information. For example, the UE may continue to camp on a current serving cell, that is, the serving cell remains unchanged.

Alternatively, if the reselection configuration information includes the reselection target information, and the UE satisfies the non-reselection configuration information, the UE may not perform measurement based on the reselection target information. Optionally, the UE may perform measurement for cell reselection based on the reselection priority configuration information described above.

The non-reselection condition information is used to indicate the UE not to perform measurement based on the reselection configuration information when the UE satisfies the non-reselection condition information. The non-reselection condition information may include information about a measurement target cell, or include information about a measurement target cell and a quality threshold. The information of the measurement target cell may be a frequency, or a frequency and a physical cell identifier, or a CGI. It can be understood that, when the non-reselection condition information includes the information about the measurement target cell, "the UE performs measurement" may at least include "the UE performs measurement based on the information about the measurement target cell".

The non-reselection area information is used to indicate the UE to determine an area in which the UE does not need to perform measurement based on the reselection configuration information. The non-reselection area information may include a longitude and/or latitude range, or other area range information.

The non-reselection time range information is used to indicate the UE to determine a time range within which the UE does not need to perform measurement based on the reselection configuration information. In other words, the UE does not perform measurement based on the reselection configuration information within the time range indicated by the non-reselection time range information. The non-reselection time range information may include information about latest time when the UE does not perform measurement based on the reselection configuration information, or information about end time when the UE does not perform measurement based on the reselection configuration information. The information about the latest time when the UE does not perform measurement based on the reselection configuration information or the information about the end time when the UE does not perform measurement based on the reselection configuration information may be reselection trigger time information or information about a moment after reselection trigger time. Alternatively, the latest time determined by the non-reselection time range information is end time determined by the reselection time range information, or a moment after end time determined by the reselection time range information. Alternatively, in still another possible implementation, the non-reselection time range information is the reselection time range information in the embodiment corresponding to FIG. 3. For details, refer to the descriptions in the embodiment corresponding to FIG. 3. Details are not described herein again. In a possible implementation, the non-reselection time range information may alternatively be predefined as the reselection trigger time information, that is, the time range indicated by the non-reselection time range information is the same as a time range indicated by the reselection trigger time information.

Step 402: The UE determines, based on the non-reselection configuration information, whether to perform measurement for cell reselection based on the reselection configuration information.

In an implementation, for example, the non-reselection configuration information includes at least the information about the measurement target cell, or the information about the measurement target cell and the quality threshold. The network device may determine the information about the measurement target cell in the non-reselection condition information based on a moving track of the satellite and information about a neighboring cell. Optionally, the quality threshold may also be predefined, that is, the reselection configuration information may not carry the quality threshold. In an example, refer to FIG. 2A. Non-reselection condition information sent by the network device to the UE in the cell 2 of the satellite 2 includes a frequency and a PCI of the cell 1. If the UE determines that the UE can obtain the cell 1 through measurement, the UE does not perform measurement based on the reselection configuration information. For example, if the UE 1 can obtain the cell 1 through the measurement before cell hopping, the UE 1 does not perform measurement based on the reselection configuration information after the cell hopping. In other words, the UE 1 still camps on the cell 2, that is, a serving cell of the UE 1 is still the cell 2. Alternatively, if quality of the cell 1 obtained by the UE through the measurement is higher than the quality threshold, the UE does not perform reselection.

In another possible implementation, for example, the non-reselection configuration information includes at least the non-reselection area information. If the UE can determine that the UE is in a non-reselection area, the UE does not perform measurement based on the reselection configuration information. The UE may determine, based on position information determined based on a positioning capability of the UE, that the UE is in the non-reselection area, or may determine, based on position information received from the network device, that the UE is in the non-reselection area. In an example, refer to FIG. 2A. A longitude and/or latitude range indicated by non-reselection area information sent by the network device to the UE in the cell 2 of the satellite 2 includes an overlapping coverage area A in FIG. 2A. If the UE 1 determines that the UE 1 is in the overlapping coverage area A, the UE 1 determines not to perform measurement based on the reselection configuration information after cell hopping.

In still another possible implementation, for example, the non-reselection configuration information includes at least the non-reselection time range information. The UE may start a timer based on the non-reselection time range information. For example, if the non-reselection time range information includes a time length, the UE may start the timer after receiving the non-reselection configuration information. Therefore, an effective time range of the timer is from a start moment of the timer to the start moment of the timer+the time length. For another example, if the non-reselection time range information includes start time information and end time information, the UE starts the timer at a moment indicated by the start time information, and stops the timer at a moment indicated by the end time information. Therefore, an effective time range of the timer is from the start moment to the end moment. For still another example, if the non-reselection time range information includes the information about the end time when the UE does not perform measurement based on the reselection configuration information, the UE starts the timer after receiving the non-reselection configuration information. Therefore, an effective time range of the timer is from a start moment of the timer to a moment indicated by the information about the end time when the UE does not perform measurement based on the reselection configuration information. The UE may not perform measurement based on the reselection configuration information within running time of the timer. Optionally, the UE may not perform measurement within the running time of the timer. It may be understood that the "measurement" herein is measurement other than measurement on a current cell. Alternatively, the UE only does not perform measurement based on the reselection configuration information within the running time of the timer. Optionally, the UE may perform measurement for cell reselection based on the reselection priority configuration information described above.

In a specific embodiment, an example in which a terminal device receives the reselection configuration information and the non-reselection configuration information that are sent by the network device, and the network device is a base station or the satellite in the transparent forwarding mode is used for description. For example, refer to FIG. 2A. At a moment before the moment T2, the base station 2 determines non-reselection configuration information and reselection configuration information.

The non-reselection configuration information includes:
(1) information about a measurement target cell: a frequency and a PCI of the cell 1;
(2) a quality threshold: Q1; and
(3) non-reselection time range information, where end time information is T3.

The reselection configuration information includes:
(1) reselection trigger time information: T2;
(2) reselection target information: a frequency and a PCI of the cell 3; and
(3) reselection time range information: T2 to T3.

The base station 2 sends the reselection configuration information and the non-reselection configuration information to UEs (including the UE 1 and the UE 2) in the cell 2. For example, the base station 2 may send the reselection configuration information and the non-reselection configuration information to UE through the network device on the satellite 2 connected to the base station 2. For example, the base station 2 or the network device on the satellite 2 may send the reselection configuration information and the non-reselection configuration information to UE at any moment before the moment T2.

The UE 1 and the UE 2 first determine, based on the non-reselection configuration information, whether to perform cell reselection.

For example, if the UE 1 determines, based on the non-reselection configuration information, that the UE 1 can obtain the frequency and the PCI of the cell 1 through measurement, and quality of the cell 1 is greater than the quality threshold (Q1), the UE 1 determines that the UE 1 satisfies a condition of the non-reselection configuration information, that is, the UE 1 does not need to perform measurement based on the reselection configuration information after T2. Therefore, when the moment T2 arrives, the UE 1 still camps on the cell 2. Although a satellite connected to the UE 1 changes from the satellite 2 to the satellite 1, the UE 1 still camps on the cell 2 from the perspective of the UE 1. Therefore, for the UE 1, the UE 1 does not perform a cell reselection operation in the following step 403 before the moment T3 or within a time range from T2 to T3. Alternatively, optionally, the UE 1 may perform measurement based on the reselection priority configuration information described above before the moment T3.

Step 403: The UE performs measurement for cell reselection based on the reselection configuration information.

This step is optional.

For UE, when it is determined in the foregoing step 402 that the UE does not satisfy the non-reselection configuration information, step 403 is performed.

For an implementation in which the UE performs measurement for cell reselection based on the reselection configuration information, refer to the descriptions in step 302 in the embodiment corresponding to FIG. 3. Details are not described herein again.

Optionally, in another implementation method, for UE, when it is determined in the foregoing step 402 that the UE does not satisfy the non-reselection configuration information, the UE may alternatively perform measurement for cell reselection based on the reselection configuration information and the reselection priority configuration information.

Based on the foregoing embodiment, the non-reselection configuration information is introduced, so that unnecessary cell reselection of some UEs is avoided, and energy consumption of the UE is reduced. In addition, the reselection configuration information is introduced, so that the UE performs cell reselection in a satellite scenario, to reduce unnecessary reselection measurement, and further reduce the energy consumption of the UE.

Figure 5:
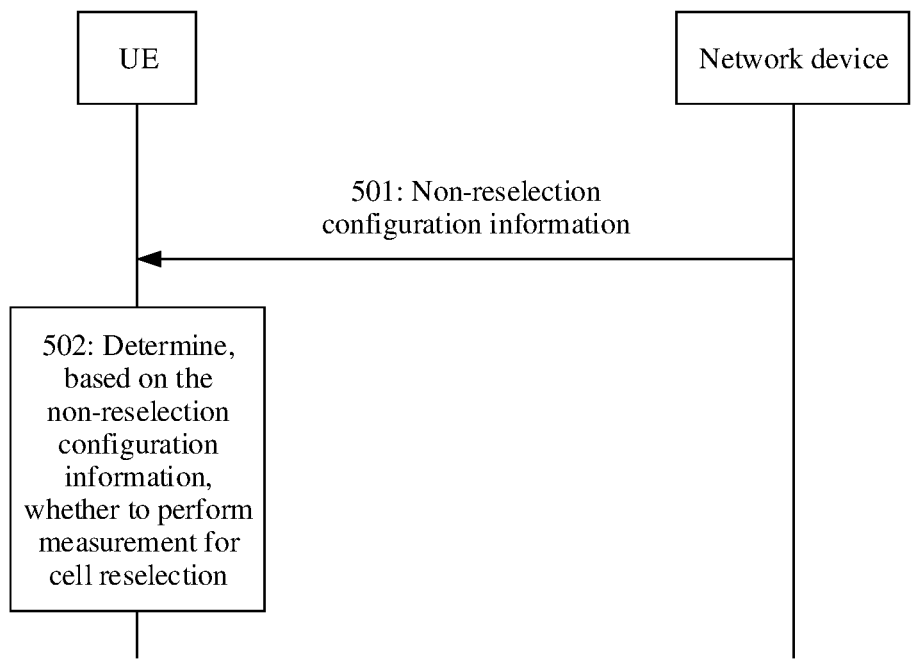
FIG. 5 is a schematic diagram of still another cell reselection method according to an embodiment of this application.

As shown in FIG. 5, an embodiment of this application provides still another cell reselection method. The method may be applied to a scenario in which hopping is triggered, or may be applied to a scenario after hopping occurs. On a UE side, the method may be performed by UE or a component (for example, a chip or a circuit) used in the UE. On a network side, the method may be performed by a network device (which may be a RAN device, a DU, or a CU) or a component (for example, a chip or a circuit) used in the network device. For ease of description, an example in which the method is performed by the UE and the network device is used below for description.

The method includes the following steps.

Step 501: The network device sends non-reselection configuration information to the UE.

Accordingly, the UE may receive the non-reselection configuration information.

Step 502: The UE determines, based on the non-reselection configuration information, whether to perform measurement for cell reselection.

When the UE satisfies the non-reselection configuration information, the UE determines not to perform measurement for cell reselection.

When the UE does not satisfy the non-reselection configuration information, the UE determines to perform measurement for cell reselection. Optionally, the UE may perform measurement for cell reselection based on reselection priority configuration information. For a specific implementation method in which the UE performs measurement for cell reselection based on the reselection priority configuration information, refer to the related descriptions in the embodiment corresponding to FIG. 4. Details are not described again.

It should be noted that, for various different implementations of content carried in the non-reselection configuration information in the embodiment corresponding to FIG. 4, refer to the corresponding implementations of the non-reselection configuration information in the embodiment corresponding to FIG. 4. Details are not described herein again. In other words, the non-reselection configuration information in the embodiment corresponding to FIG. 5 may be the same as the non-reselection configuration information in the embodiment corresponding to FIG. 4. Therefore, for various different implementations of determining whether the UE satisfies the non-reselection configuration information in the embodiment corresponding to FIG. 5, refer to the corresponding descriptions in the embodiment corresponding to FIG. 4.

A main difference between the embodiment corresponding to FIG. 4 and the embodiment corresponding to FIG. 5 lies in that: In the embodiment corresponding to FIG. 4, when the UE satisfies the non-reselection configuration information, the UE determines not to perform measurement for cell reselection based on the reselection configuration information, but may perform measurement for cell reselection based on the reselection priority configuration information or not perform reselection; when the UE does not satisfy the non-reselection configuration information, the UE determines to perform measurement for cell reselection based on the reselection configuration information, or determines to perform measurement for cell reselection based on the reselection configuration information and the reselection priority configuration information. However, in the embodiment corresponding to FIG. 5, when the UE satisfies the non-reselection configuration information, the UE determines not to perform measurement for cell reselection; when the UE does not satisfy the non-reselection configuration information, the UE determines to perform measurement for cell reselection, for example, the UE may perform measurement for cell reselection based on the reselection priority configuration information. Based on the foregoing embodiment, the non-reselection configuration information is introduced, so that unnecessary cell reselection of some UEs is avoided, and energy consumption of the UE is reduced. Optionally, the reselection priority configuration information is introduced, so that the UE performs cell reselection in a satellite scenario, to reduce unnecessary reselection measurement, and further reduce the energy consumption of the UE.

Figure 6:
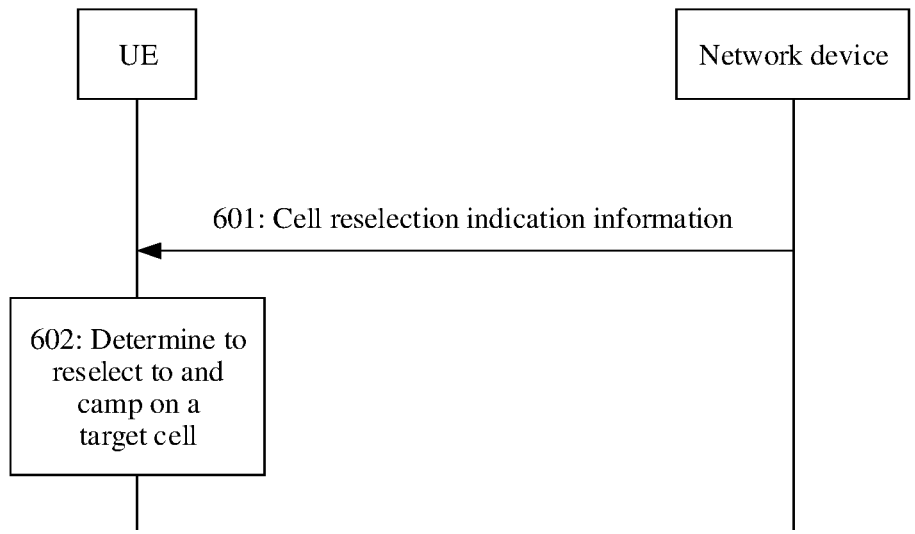
FIG. 6 is a schematic diagram of yet another cell reselection method according to an embodiment of this application.

As shown in FIG. 6, an embodiment of this application provides yet another cell reselection method. The method may be applied to a scenario before cell hopping occurs. On a UE side, the method may be performed by UE or a component (for example, a chip or a circuit) used in the UE. On a network side, the method may be performed by a network device (which may be a RAN device, a DU, or a CU) or a component (for example, a chip or a circuit) used in the network device. For ease of description, an example in which the method is performed by the UE and the network device is used below for description.

The method includes the following steps.

Step 601: The network device sends cell reselection indication information to the UE.

Accordingly, the UE may receive the cell reselection indication information.

The cell reselection indication information is used to indicate the UE to immediately perform cell reselection, indicate the UE to immediately perform measurement for cell reselection, indicate the UE to set a priority of a frequency of a current serving cell to the lowest, indicate the UE to set a priority of a current serving cell to the lowest, indicate that a current serving cell of the UE is to hop, or indicate that a current serving cell is a hopping cell.

For example, in an implementation in which the UE determines whether a cell is a "hopping cell", when the network device sends the cell reselection indication information to the UE, it indicates that the cell is the "hopping cell"; or when the network device does not send the cell reselection indication information to the UE, the cell is a "non-hopping cell". Alternatively, the network device sends the cell reselection indication information to the UE, where different values of the cell reselection indication information indicate whether the cell is a "hopping cell" or a "non-hopping cell".

The cell reselection indication information may be carried in a multicast message, a unicast message, downlink control information, an SMS message, a paging message, or a system message.

Step 602: The UE determines to reselect to and camp on a target cell. The target cell is a non-hopping cell in candidate cells whose measured cell quality satisfies a first criterion, and the target cell is a suitable cell.

For example, a method for the UE to determine whether a cell is the hopping cell may be as follows: The UE reads a system message sent by the cell. If the system message sent by the cell carries the cell reselection indication information (or the carried cell reselection indication information indicates that the cell is the hopping cell), it indicates that the cell is the hopping cell. An implementation and a function of the cell reselection indication information is similar to those of the cell reselection indication information in step 601, and details are not described again.

For example, a method for the UE to determine whether a cell is the suitable cell may be a method in which the UE determines, depending on whether the UE is a subscriber of a network identifier to which the cell belongs and whether a state of the cell is "access restricted" or "access barred", whether the cell is the suitable cell. In a possible implementation, if the UE first determines, based on the system message sent by the cell, that the UE is the subscriber of the network identifier to which the cell belongs, and then the UE determines, based on the system message sent by the cell, that the state of the cell is not "access restricted" or "access barred", the UE may determine that the cell is the suitable cell. If the UE determines, based on the system message sent by the cell, that the state of the cell is "access restricted" or "access barred", the UE may determine that the cell is not the suitable cell.

As an example, the following provides an implementation in which the UE determines the target cell from the candidate cells in step 602, and the implementation includes some or all of the following steps A to C.

Step A: The UE determines a first cell from the candidate cells whose cell quality satisfies the first criterion.

The first cell is a cell with best quality in the candidate cells. The cell with the "best quality" may be a cell with a maximum ranking value in the candidate cells, or may be a cell that has a largest quantity of good beams (for example, beams whose beam quality exceeds a threshold) in second cells. The second cells include the cell with the maximum ranking value and a cell having a ranking value whose difference value from the maximum ranking value is within a specified range (for example, x dB, where x is configurable) that are in the candidate cells.

Optionally, the candidate cells do not include the current serving cell of the UE.

Optionally, if the candidate cells include the current serving cell, the UE sets the priority of the current serving cell to the lowest based on the cell reselection indication information. Alternatively, it is understood that a ranking value of the current serving cell is ranked last.

Step B: The UE attempts to perform reselection to the first cell.

That the UE attempts to perform reselection to the first cell may be understood as that the UE attempts to reselect to the first cell, but the reselection may succeed or fail.

For example, a process in which the UE performs reselection to the first cell may be:

(1) If the first cell is not the hopping cell or the suitable cell, the UE determines not to reselect to the first cell, that is, the reselection fails, and step C is performed.

(2) If the first cell is the non-hopping cell and the suitable cell, the UE may reselect to and camp on the first cell, that is, the reselection succeeds, and the process ends. In this case, the first cell may be referred to as the target cell.

Step C: The UE sets a ranking of the first cell to the lowest, or sets a priority of the first cell to the lowest.

That is, in step C, the first cell originally ranked first in the candidate cells is moved to a position ranked last.

In another implementation method, in step C, the UE may alternatively move the first cell originally ranked first in the candidate cells to a position ranked in the middle, that is, move to a position between a position ranked first and a position ranked last.

After step C, a ranking of the candidate cells changes, and then the process goes to step A. That is, based on a latest ranking result, an operation of selecting the first cell continues to be performed until a cell in the candidate cells is successfully reselected, or none of the candidate cells can be successfully reselected.

Optionally, if none of the candidate cells can be reselected successfully, the UE may camp on the current serving cell.

In an implementation, in the foregoing step C, the UE may alternatively exclude, from the candidate cells, a current first cell in the candidate cells, or exclude, from the candidate cells, a current first cell and another cell (which may be referred to as a third cell) on a same frequency as the current first cell that are in the candidate cells. Alternatively, in a period of time (for example, a maximum of 300 s), the UE may exclude, from the candidate cells, a current first cell in the candidate cells, or exclude, from the candidate cells, a current first cell and a third cell that are in the candidate cells. In other words, in the period of time, the current first cell or the current first cell and the third cell do not participate in selection to the first cell in a subsequent step, that is, in the period of time, the UE does not select the current first cell or either of the current first cell and the third cell as the first cell in a next round of selection.

The following provides descriptions with reference to two examples.

Example 1

With reference to FIG. 2A, for example, at any moment before the moment T2, the UE 1 receives cell reselection indication information sent by a serving cell (namely, the cell 2) through the satellite 2, and the UE 1 determines, based on the cell reselection indication information, that the cell 2 is to hop, to trigger the UE 1 to perform a cell reselection process. For example, the UE 1 obtains the cell 1 and the cell 2 through measurement, performs rankings on the cell 1 and the cell 2, and sets a ranking of the cell 2 to the lowest, to obtain a ranking result: cell 1>cell 2.

Then, the UE 1 reads a system message sent by the cell 1 (in this case, the cell 1 may be referred to as a first cell). Because the cell 1 is a hopping cell, the cell reselection indication information is carried in the system message. The UE 1 determines that the cell 1 is the hopping cell by reading the system message of the cell 1. Therefore, the UE 1 determines to camp on a current serving cell, namely, the cell 2. In other words, if the UE determines that all obtained cells (namely, the cell 1 and the cell 2) through the measurement are hopping cells, the UE determines to camp on the current serving cell.

Example 2

Figure 2B:
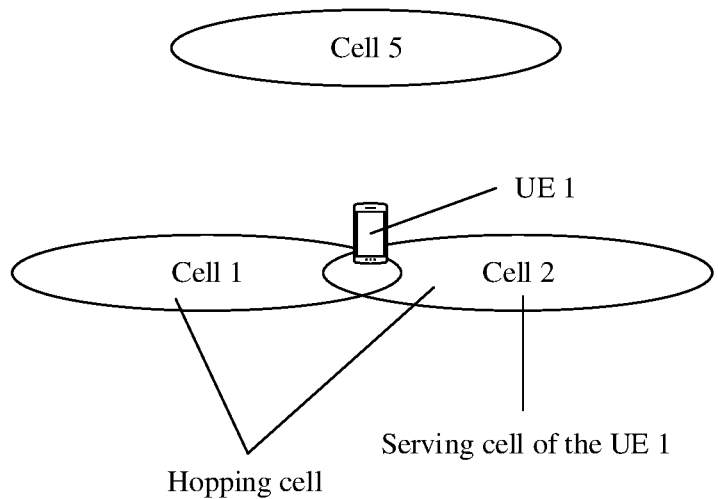
FIG. 2B is another example diagram of hopping of a cell served by a satellite.

With reference to FIG. 2B, for another example, at any moment before a moment T2, UE 1 receives cell reselection indication information sent by a serving cell (namely, a cell 2) through a satellite 2, and the UE 1 determines, based on the cell reselection indication information, that the cell 2 is to hop, to trigger the UE 1 to perform a cell reselection process. For example, the UE 1 obtains a cell 1, the cell 2, and a cell 5 through measurement, performs rankings on the cell 1, the cell 2, and the cell 5, and sets a ranking of the cell 2 to the lowest. For example, an obtained ranking result is: cell 1>cell 5>cell 2.

Then, the UE 1 reads a system message sent by the cell 1 (in this case, the cell 1 may be referred to as a first cell). Assuming that the cell 1 is a hopping cell, the cell reselection indication information is carried in the system message. The UE 1 determines that the cell 1 is the hopping cell by reading the system message of the cell 1. In this case, regardless of whether the cell 1 is a suitable cell, the UE 1 sets a ranking of the cell 1 to the lowest. Alternatively, it is understood that because the cell 1 is the hopping cell, the UE 1 sets a ranking of the cell 1 to the lowest without determining whether the cell 1 is a suitable cell. A new ranking result is: cell 5>cell 2>cell 1.

Then, the UE 1 reads a system message of the cell 5 (in this case, the cell 5 may be referred to as the first cell). For example, the system message of the cell 5 does not carry the cell reselection indication information (that is, the cell 5 is a non-hopping cell), and a state of the cell 5 is not "access restricted" or "access barred" (that is, the cell 5 is the suitable cell), so that the UE 1 determines to camp on the cell 5.

Based on the foregoing embodiment, before the cell hopping occurs, the network device indicates the UE to perform reselection to another non-hopping cell or camp on the current serving cell. This helps avoid impact of the cell hopping on a service of the UE, and ensures service experience of the UE. In addition, this helps avoid an increase in energy consumption of the UE caused by unnecessary reselection.

It should be noted that an NTN system is used as an example for description in this embodiment of this application. This embodiment of this application is also applicable to a TN system. This is not limited in this embodiment of this application.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It should be noted that the embodiment corresponding to FIG. 3 to the embodiment corresponding to FIG. 6 may be implemented in a combination manner. For example, the embodiment corresponding to FIG. 6 may be performed first. If the UE does not complete the cell reselection after performing the embodiment corresponding to FIG. 6, that is, all cells obtained by the UE through the measurement are hopping cells, the UE camps on the current serving cell. In this case, the embodiment corresponding to FIG. 3, the embodiment corresponding to FIG. 4, or the embodiment corresponding to FIG. 5 may be further performed, and then the UE determines whether to attempt to perform cell measurement for cell reselection. For another example, the embodiment corresponding to FIG. 4 or the embodiment corresponding to FIG. 5 may be first performed. If the UE performs measurement based on the reselection priority configuration information in the embodiment corresponding to FIG. 4 or FIG. 5, the implementation may be performed with reference to the embodiment corresponding to FIG. 6, that is, the UE performs measurement based on the reselection priority configuration information. If the target cell (namely, a non-hopping cell with best quality) exists in the measured candidate cells, the UE attempts to perform reselection to the target cell.

It should be noted that, in embodiments of this application, when the network device includes a CU and a DU, the CU may send any information in any one of the foregoing embodiments to the DU. For example, the non-reselection configuration information, the reselection configuration information, and/or the cell reselection indication information is sent by using a system message. The CU sends at least one of the foregoing information to the DU, and the DU sends the at least one of the foregoing information to the terminal device.

Alternatively, when the network device includes a CU and a DU, the DU may send the non-reselection configuration information, the reselection configuration information, the cell reselection indication information, and/or hopping indication information to the CU, where the hopping indication information is used by the CU to determine that a cell served by the DU is to hop. Optionally, the DU may further send information about the cell served by the DU to the CU. The information about the cell herein may include at least one of a cell identifier, a cell frequency, a physical cell identifier, or a cell global identifier. For example, any piece of the foregoing information may be sent by using at least one of an interface setup request message, an interface setup response message, a configuration update message, or a configuration update acknowledgement message. For example, the DU sends at least one of the non-reselection configuration information, the reselection configuration information, or the cell reselection indication information to the CU. The CU may encode a system message or a system information block based on the information received from the DU, or the CU may determine a handover target based on the information received from the DU, so that the CU can hand over the UE to another network device in a timely manner. Optionally, when handing over the UE to the another network device, the CU may further indicate that a handover reason is "satellite movement" or "cell hopping". For example, the DU sends the hopping indication information and information about a first cell served by the DU to the CU. The CU may determine that the first cell is to hop. Therefore, the CU configures UE in the first cell to perform measurement or handover, to ensure service experience of the UE in the first cell.

Optionally, the network device (referred to as a first network device below) in any one of the foregoing embodiments may directly (through an interface between base stations, for example, an X2 or Xn interface) or indirectly (through an interface between a base station and a core network device, for example, an Si or NG interface) send the non-reselection configuration information, the reselection configuration information, the cell reselection indication information, and/or the hopping indication information to another network device (referred to as a second network device below). Optionally, the first network device may further send information about a first cell served by the first network device to the second network device. For example, the foregoing information may be sent by using at least one of the following messages: an X2/Xn interface setup request message, an X2/Xn interface setup response message, a node configuration update message, a node configuration update acknowledgement message, a handover request (handover required) message, a handover request acknowledgement message, or a handover command message. In the foregoing interaction mechanism, the second network device may determine that the first cell served by the first network device is to hop, so that the second network device can determine whether to prevent the UE on the second network device from reselecting or handing over to the first network device.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed. In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing method embodiments, the method implemented by the terminal device may also be implemented by a component (for example, a chip or a circuit) used in the terminal device. The method implemented by the network device may also be implemented by a component (for example, a chip or a circuit) used in the network device. This is not limited in embodiments of this application.

Figure 7:
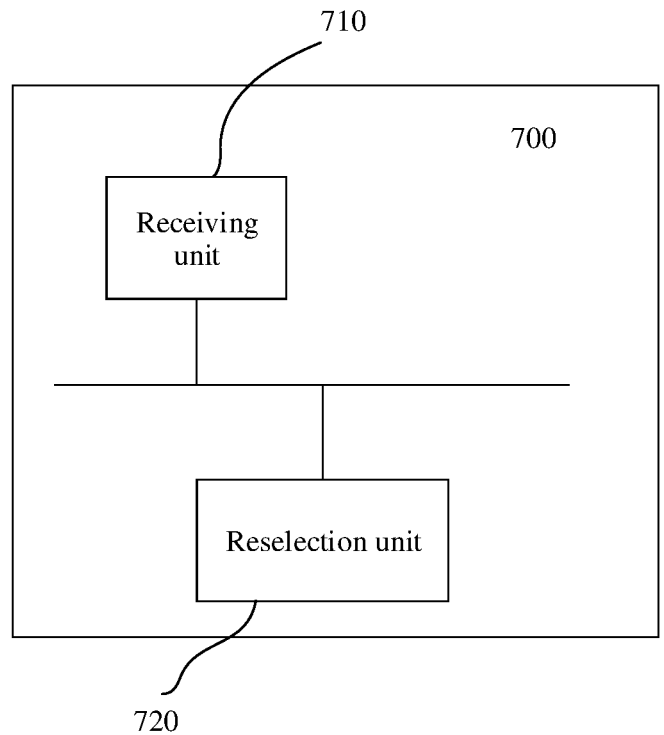
FIG. 7 is a schematic diagram of a communication apparatus according to an embodiment of this application.

FIG. 7 is a block diagram of a possible example of a communication apparatus 700 according to an embodiment of this application. The communication apparatus 700 may exist in a form of software or hardware. The communication apparatus 700 may include a receiving unit 710 and a reselection unit 720. The receiving unit 710 is configured to support the communication apparatus 700 in communicating with another network entity or another module in the communication apparatus 700. Optionally, the communication apparatus 700 may further include a storage unit. The storage unit may be configured to store instructions and/or data. The reselection unit 720 may read the instructions and/or the data in the storage unit, to enable the communication apparatus 700 to implement a corresponding method.

In a possible manner, when the reselection unit 720 is integrated into one processing unit, the processing unit may be a processor or a controller, for example, may be a general-purpose central processing unit (CPU), a general-purpose processor, a digital signal processing (DSP), an application-specific integrated circuit (ASIC), a field programmable gate array (FPGA) or another programmable logic device, a transistor logic device, a hardware component, or any combination thereof. The processing unit can implement or execute various example logical blocks, modules, and circuits described with reference to content disclosed in embodiments of this application. Alternatively, the processor may be a combination of processors implementing a computing function, for example, a combination of one or more microprocessors, or a combination of a DSP and a microprocessor. The receiving unit 710 may be a communication interface, a receiver, a receiving circuit, or the like. The communication interface is a general term. During specific implementation, the communication interface may include at least one interface.

The communication apparatus 700 may be the terminal device configured to perform the embodiments corresponding to FIG. 3 and/or FIG. 4 and/or FIG. 5 and/or FIG. 6, or the chip configured to perform the steps corresponding to the terminal device in the embodiments corresponding to FIG. 3 and/or FIG. 4 and/or FIG. 5 and/or FIG. 6. For example, when the reselection unit 720 is integrated into one processing unit, the processing unit may be, for example, a processor, and the receiving unit 710 may be, for example, a receiver. The receiver includes a radio frequency circuit. For another example, when the reselection unit 720 is integrated into one processing unit, the processing unit may be, for example, a processor, and the receiving unit 710 may be, for example, an input interface, a pin, or a circuit.

In an embodiment:

The receiving unit 710 is configured to receive reselection configuration information from a network device, where the reselection configuration information includes reselection trigger information, the reselection trigger information is used to trigger measurement for cell reselection, and the reselection trigger information includes reselection trigger time information or reselection trigger indication information. The reselection unit 720 is configured to perform measurement for cell reselection based on the reselection configuration information.

In some possible implementation methods, the reselection trigger information includes the reselection trigger time information. The reselection unit 720 is specifically configured to start the measurement for cell reselection at a moment indicated by the reselection trigger time information.

In some possible implementation methods, the reselection trigger information includes the reselection trigger indication information. The reselection unit 720 is specifically configured to start the measurement for cell reselection at a moment when the reselection trigger indication information is obtained.

In some possible implementation methods, the reselection configuration information further includes reselection target information, and the reselection target information is used to indicate information about a target cell for reselection measurement. The reselection unit 720 is specifically configured to: determine, based on the reselection trigger information, to perform measurement; and perform reselection to the target cell if quality of the target cell is available through the measurement and the target cell satisfies a first criterion.

In some possible implementation methods, the reselection configuration information further includes reselection time range information. That the reselection unit 720 is configured to perform reselection to the target cell if quality of the target cell is available through the measurement and the target cell satisfies a first criterion includes: The reselection unit 720 is configured to perform reselection to the target cell if quality of the target cell is available through the measurement within a time range indicated by the reselection time range information and the target cell satisfies the first criterion.

In another embodiment:

The receiving unit 710 is configured to receive non-reselection configuration information and reselection configuration information from a network device. The reselection unit 720 is configured to determine, based on the non-reselection configuration information, whether to perform measurement for cell reselection based on the reselection configuration information.

In some possible implementation methods, the non-reselection configuration information includes non-reselection condition information, where the non-reselection condition information includes information about a measurement target cell. The reselection unit 720 is specifically configured to determine not to perform measurement for cell reselection based on the reselection configuration information if quality of the measurement target cell is available through measurement.

In some possible implementation methods, the non-reselection condition information further includes a quality threshold. The reselection unit 720 is specifically configured to determine not to perform measurement for cell reselection based on the reselection configuration information if quality of the measurement target cell is available through measurement and quality of the measurement target cell is higher than the quality threshold.

In some possible implementation methods, the non-reselection configuration information includes non-reselection area information. The reselection unit 720 is specifically configured to determine not to perform measurement for cell reselection based on the reselection configuration information if a terminal device is located in an area indicated by the non-reselection area information.

In some possible implementation methods, the non-reselection configuration information includes non-reselection time range information. The reselection unit 720 is specifically configured to determine not to perform measurement for cell reselection based on the reselection configuration information within a non-reselection time range.

In some possible implementation methods, the reselection unit 720 is further configured to: after determining not to perform measurement for cell reselection based on the reselection configuration information, skip performing measurement for cell reselection.

In some possible implementation methods, the reselection unit 720 is further configured to: after determining not to perform measurement for cell reselection based on the reselection configuration information, perform measurement for cell reselection based on reselection priority configuration information of a neighboring cell of a serving cell, where the reselection priority configuration information includes dedicated reselection priority configuration information and/or common reselection priority configuration information.

In some possible implementation methods, the reselection unit 720 is further configured to: after determining to perform measurement for cell reselection based on the reselection configuration information, perform measurement for cell reselection based on the reselection configuration information.

In some possible implementation methods, the reselection configuration information includes reselection trigger information, the reselection trigger information is used to trigger the measurement for cell reselection, and the reselection trigger information includes reselection trigger time information or reselection trigger indication information.

In some possible implementation methods, the reselection trigger information includes the reselection trigger time information. That the reselection unit 720 is configured to perform measurement for cell reselection based on the reselection configuration information includes: The reselection unit 720 is configured to start the measurement for cell reselection at a moment indicated by the reselection trigger time information.

In some possible implementation methods, the reselection trigger information includes the reselection trigger indication information. That the reselection unit 720 is configured to perform measurement for cell reselection based on the reselection configuration information includes: The reselection unit 720 is configured to start the measurement for cell reselection at a moment when the reselection trigger indication information is obtained.

In some possible implementation methods, the reselection configuration information further includes reselection target information, and the reselection target information is used to indicate information about a target cell t for reselection measurement.

That the reselection unit 720 is configured to perform measurement for cell reselection based on the reselection configuration information includes: The reselection unit 720 is configured to: determine to perform measurement based on the reselection trigger information; and perform reselection to the target cell if quality of the target cell is available through the measurement and the target cell satisfies a first criterion.

In some possible implementation methods, the reselection configuration information further includes reselection time range information. That the reselection unit 720 is configured to perform reselection to the target cell if quality of the target cell is available through the measurement and the target cell satisfies a first criterion includes: The reselection unit 720 is configured to perform reselection to the target cell if quality of the target cell is available through the measurement within a time range indicated by the reselection time range information and the target cell satisfies the first criterion.

In still another embodiment:

The receiving unit 710 is configured to receive cell reselection indication information of a serving cell from a network device, where the cell reselection indication information is used to indicate that the serving cell is a hopping cell.

The reselection unit 720 is configured to: perform cell measurement based on the cell reselection indication information, and obtain, through the measurement, at least one candidate cell that satisfies a first criterion; and determine to reselect to and camp on a target cell, where the target cell is a non-hopping cell in the at least one candidate cell, and the target cell is a suitable cell.

In some possible implementation methods, the cell reselection indication information is carried in an SMS message, a paging message, or a system message.

For specific beneficial effects of the cell reselection method that is performed by the apparatus shown in FIG. 7, refer to the related descriptions in the foregoing method embodiments shown in FIG. 3, FIG. 4, FIG. 5, and FIG. 6. Details are not described herein again. It may be understood that the units in this embodiment of this application may also be referred to as modules. The foregoing units or modules may exist independently, or may be integrated together.

Figure 8:
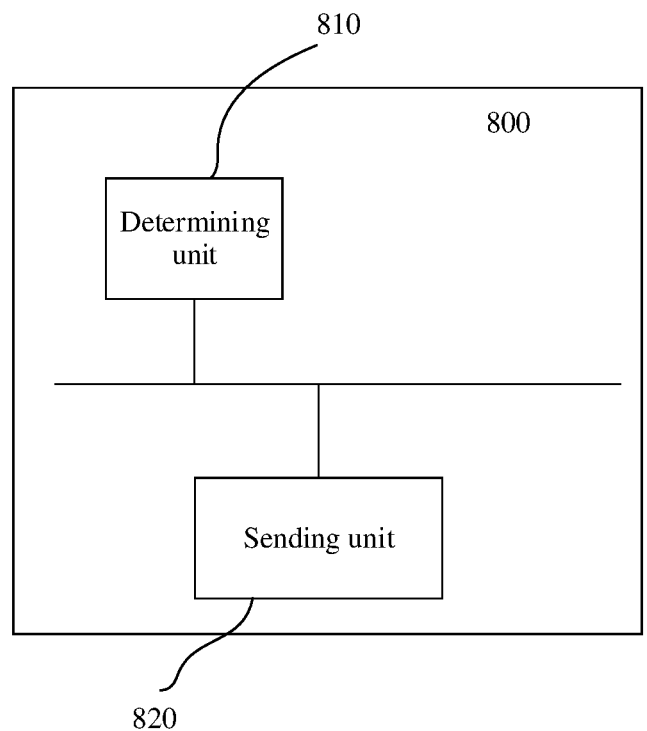
FIG. 8 is a schematic diagram of another communication apparatus according to an embodiment of this application.

FIG. 8 is a block diagram of a possible example of a communication apparatus 800 according to an embodiment of this application. The communication apparatus 800 may exist in a form of software or hardware. The communication apparatus 800 may include a determining unit 810 and a sending unit 820. The sending unit 820 is configured to support the communication apparatus 800 in communicating with another network entity or another module in the communication apparatus 800. Optionally, the communication apparatus 800 may further include a storage unit. The storage unit may be configured to store instructions and/or data. The determining unit 810 may read the instructions and/or the data in the storage unit, to enable the communication apparatus 800 to implement a corresponding method.

In a possible manner, when the determining unit 810 is integrated into one processing unit, the processing unit may be a processor or a controller, for example, may be a CPU, a general-purpose processor, a DSP, an ASIC, an FPGA or another programmable logic device, a transistor logic device, a hardware component, or any combination thereof. The processing unit can implement or execute various example logical blocks, modules, and circuits described with reference to content disclosed in embodiments of this application. Alternatively, the processor may be a combination of processors implementing a computing function, for example, a combination of one or more microprocessors, or a combination of a DSP and a microprocessor. The sending unit 820 may be a communication interface, a transmitter, a transmitting circuit, or the like. The communication interface is a general term. During specific implementation, the communication interface may include at least one interface.

The communication apparatus 800 may be the network device configured to perform the embodiments corresponding to FIG. 3 and/or FIG. 4 and/or FIG. 5 and/or FIG. 6, or the chip configured to perform the steps corresponding to the network device in the embodiments corresponding to FIG. 3 and/or FIG. 4 and/or FIG. 5 and/or FIG. 6. For example, when the determining unit 810 is integrated into one processing unit, the processing unit may be, for example, a processor, and the sending unit 820 may be, for example, a transmitter. The transmitter includes a radio frequency circuit. For another example, when the determining unit 810 is integrated into one processing unit, the processing unit may be, for example, a processor, and the sending unit 820 may be, for example, an output interface, a pin, or a circuit.

In an embodiment:

The determining unit 810 is configured to determine reselection configuration information, where the reselection configuration information includes one or more of reselection trigger information, reselection target information, and reselection time range information; the reselection trigger information is used to trigger measurement for cell reselection; the reselection trigger information includes reselection trigger time information or reselection trigger indication information; the reselection target information is used to indicate information about a target cell for reselection measurement; and the reselection time range information is used to indicate a time range within which the target cell is measured. The sending unit 820 is configured to send the reselection configuration information to a terminal device, where the reselection configuration information is used by the terminal device to perform measurement for cell reselection.

In some possible implementation methods, the sending unit 820 is further configured to send non-reselection configuration information to the terminal device, where the non-reselection configuration information is used by the terminal device to determine whether to perform measurement for cell reselection based on the reselection configuration information; the non-reselection configuration information includes one or more of non-reselection condition information, a quality threshold, non-reselection area information, and non-reselection time range information; and the non-reselection condition information includes information about a measurement target cell.

For specific beneficial effects of the cell reselection method that is performed by the apparatus shown in FIG. 8, refer to the related descriptions in the foregoing method embodiments shown in FIG. 3, FIG. 4, FIG. 5, and FIG. 6. Details are not described herein again. It may be understood that the units in this embodiment of this application may also be referred to as modules. The foregoing units or modules may exist independently, or may be integrated together.

Figure 9:
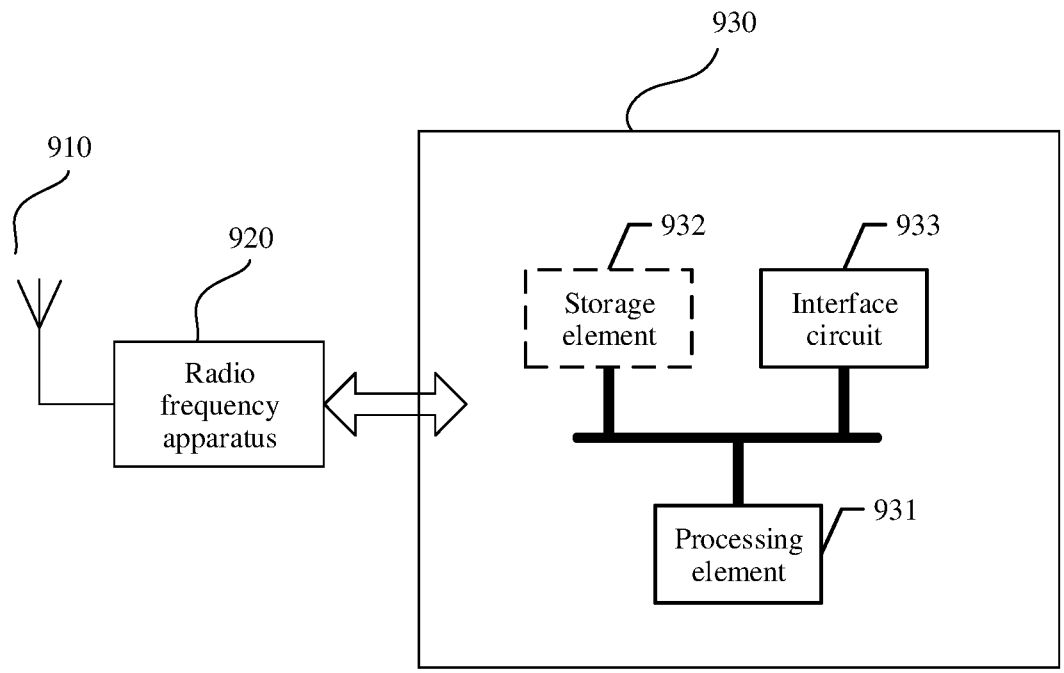
FIG. 9 is a schematic diagram of a terminal device according to an embodiment of this application.

FIG. 9 is a schematic diagram of a structure of a terminal device according to an embodiment of this application. The terminal device is configured to implement operations of the terminal device in the foregoing embodiments. As shown in FIG. 9, the terminal device includes an antenna 910, a radio frequency apparatus 920, and a signal processing part 930. The antenna 910 is connected to the radio frequency apparatus 920. In a downlink direction, the radio frequency apparatus 920 receives, through the antenna 910, information sent by a network device, and sends, to the signal processing part 930 for processing, the information sent by the network device. In an uplink direction, the signal processing part 930 processes information of the terminal device, and sends the processed information to the radio frequency apparatus 920. The radio frequency apparatus 920 processes the information of the terminal device, and then sends the processed information to the network device through the antenna 910.

The signal processing part 930 is configured to process each communication protocol layer of data. The signal processing part 930 may be a subsystem of the terminal device. The terminal device may further include another subsystem, for example, a central processing subsystem, configured to process an operating system and an application layer of the terminal device; and for another example, a peripheral subsystem, configured to connect to another device. The signal processing part 930 may be a separately disposed chip. Optionally, the foregoing apparatus may be located in the signal processing part 930.

The signal processing part 930 may include one or more processing elements 931, for example, include a main control CPU and another integrated circuit, and include an interface circuit 933. In addition, the signal processing part 930 may further include a storage element 932. The storage element 932 is configured to store data and a program. The program used to perform the methods performed by the terminal device in the foregoing methods may be stored or may not be stored in the storage element 932, for example, stored in a memory outside the signal processing part 930. When used, the signal processing part 930 loads the program into a cache for use. The interface circuit 933 is configured to communicate with the apparatus. The foregoing apparatus may be located in the signal processing part 930. The signal processing part 930 may be implemented by a chip. The chip includes at least one processing element and an interface circuit. The processing element is configured to perform steps in any method performed by the foregoing terminal device. The interface circuit is configured to communicate with another apparatus. In an implementation, units that implement the steps in the foregoing methods may be implemented in a form of a program invoked by a processing element. For example, the apparatus includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the methods performed by the terminal device in the foregoing methods may be in a storage element that is on a different chip from the processing unit, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the signal processing part 930. The processing element herein may be an integrated circuit, for example, one or more ASICs, one or more DSPs, one or more FPGAs, or a combination of these types of integrated circuits. These integrated circuits may be integrated together to form a chip.

The units configured to implement the steps in the foregoing methods may be integrated together and implemented in a form of a system-on-a-chip (SoC). The SoC chip is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any one of the methods that are provided in the foregoing method embodiments and performed by the terminal device. The processing element may perform some or all steps performed by the terminal device, in a first manner, that is, by invoking the program stored in the storage element; or may perform some or all steps performed by the terminal device, in a second manner, that is, by using a hardware integrated logic circuit in the processor element in combination with instructions; or may certainly perform, by combining the first manner and the second manner, some or all steps performed by the terminal device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be one memory, or may be a general term of a plurality of storage elements.

For specific beneficial effects of the cell reselection method that is performed by the terminal device shown in FIG. 9, refer to the related descriptions in the foregoing method embodiments shown in FIG. 3, FIG. 4, FIG. 5, and FIG. 6. Details are not described herein again. It may be understood that the units in this embodiment of this application may also be referred to as modules. The foregoing units or modules may exist independently, or may be integrated together.

Figure 10:
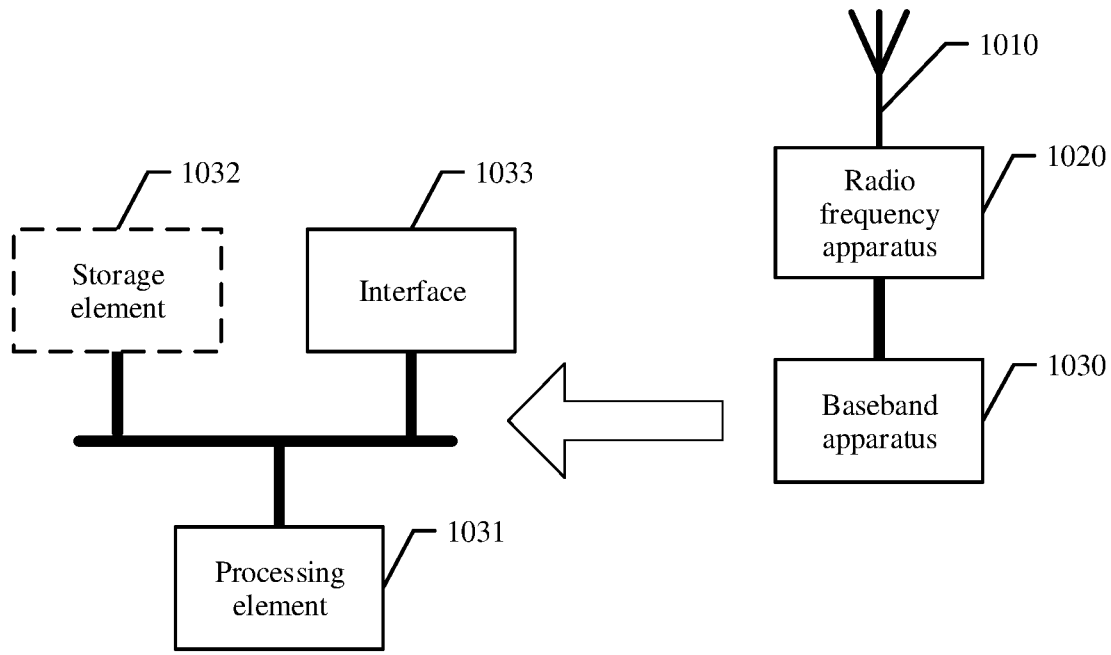
FIG. 10 is a schematic diagram of a network device according to an embodiment of this application.

FIG. 10 is a schematic diagram of a structure of a network device according to an embodiment of this application. The network device is configured to implement operations of the network device in the foregoing embodiments. As shown in FIG. 10, the network device includes an antenna 1010, a radio frequency apparatus 1020, and a baseband apparatus 1030. The antenna 1010 is connected to the radio frequency apparatus 1020. In an uplink direction, the radio frequency apparatus 1020 receives, through the antenna 1010, information sent by a terminal device; and sends, to the baseband apparatus 1030 for processing, the information sent by the terminal device. In a downlink direction, the baseband apparatus 1030 processes information of the terminal device, and sends the processed information to the radio frequency apparatus 1020. The radio frequency apparatus 1020 processes the information of the terminal device, and then sends the processed information to the terminal device through the antenna 1010.

The baseband apparatus 1030 may include one or more processing elements 1031, for example, include a main control CPU and another integrated circuit, and further include an interface 1033. In addition, the baseband apparatus 1030 may further include a storage element 1032. The storage element 1032 is configured to store a program and data. The interface 1033 is configured to exchange information with the radio frequency apparatus 1020, and the interface is, for example, a common public radio interface (CPRI). The foregoing apparatus used in the network device may be located in the baseband apparatus 1030. For example, the foregoing apparatus used in the network device may be a chip in the baseband apparatus 1030. The chip includes at least one processing element and an interface circuit. The processing element is configured to perform steps in any method performed by the network device. The interface circuit is configured to communicate with another apparatus. In an implementation, units of the network device that implement the steps in the foregoing methods may be implemented in a form of a program invoked by a processing element. For example, the apparatus used in the network device includes a processing element and a storage element. The processing element invokes a program stored in the storage element, to perform the methods performed by the network device in the foregoing method embodiments. The storage element may be a storage element on the same chip as the processing element, that is, an on-chip storage element; or may be a storage element that is on a different chip from the processing element, that is, an off-chip storage element.

In another implementation, units of the network device that implement the steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a SoC. For example, the baseband apparatus includes the SoC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and interface circuit. The at least one processing element is configured to perform any one of the methods that are provided in the foregoing method embodiments and performed by the network device. The processing element may perform some or all steps performed by the network device in a first manner, that is, by invoking the program stored in the storage element; or may perform some or all steps performed by the network device, in a second manner, that is, by using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be one memory, or may be a general term of a plurality of storage elements.

For specific beneficial effects of the cell reselection method that is performed by the network device shown in FIG. 10, refer to the related descriptions in the foregoing method embodiments shown in FIG. 3, FIG. 4, FIG. 5, and FIG. 6. Details are not described herein again. It may be understood that the units in this embodiment of this application may also be referred to as modules. The foregoing units or modules may exist independently, or may be integrated together.

An embodiment of this application further provides a communication system. The communication system includes a terminal device in any of the foregoing method embodiments and a network device in this embodiment.

A person skilled in the art may understand that first, second, and various reference numerals in embodiments of this application are for distinguishing only for ease of description, and are not used to limit the scope of embodiments of this application or represent a sequence. "And/or" describes an association relationship between associated objects and indicates that three relationships may exist. For example, A and/or B may indicate the following three cases: Only A exists, both A and B exist, and only B exists. The character "/" generally indicates an "or" relationship between associated objects. "At least one" means one or more. At least two means two or more. "At least one", "any one", or a similar expression means any combination of these items, including a single item (piece) or any combination of a plurality of items (pieces). For example, at least one item (piece, or type) of a, b, or c may indicate: a, b, c, a and b, a and c, b and c, or a, b, and c, where a, b, and c may be singular or plural. "A plurality of" means two or more, and another quantifier is similar to this.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in an ASIC, and the ASIC may be arranged in terminal. Alternatively, the processor and the storage medium may also be arranged in different components of the terminal.

These computer program instructions may be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although embodiments of this application are described with reference to specific features and the embodiments thereof, apparently, various modifications and combinations may be made to embodiments of this application without departing from the scope of embodiments of this application. Correspondingly, the specification and accompanying drawings are merely example descriptions of the embodiments of this application that are defined by the appended claims, and are considered to cover any or all of modifications, variations, combinations, or equivalents in the scope of embodiments of this application. It is clear that a person skilled in the art can make various modifications and variations to embodiments of this application without departing from the scope of embodiments of this application. In this way, embodiments of this application are intended to cover these modifications and variations of this application provided that they fall within the scope of the claims of this application and their equivalent technologies.

What is claimed is:

1. A method, comprising:
   receiving reselection configuration information from a network device, wherein the reselection configuration information comprises reselection time information and reselection target information, and the reselection target information indicates information about a target cell for reselection measurement; and
   performing measurement for cell reselection preferentially in the target cell based on the reselection target information, wherein a time for the measurement for cell reselection is moment determined based on the reselection time information; and
   performing reselection to the target cell when a quality of the target cell is available through the measurement and the quality of the target cell satisfies a first criterion.

2. The method according to claim 1, further comprising:
   receiving non-reselection configuration information from the network device; and determining, based on the non-reselection configuration information, whether to perform the measurement for cell reselection based on the reselection target information.

3. The method according to claim 2, wherein the non-reselection configuration information comprises non-reselection condition information, and the non-reselection condition information comprises information about the target cell for reselection measurement; and
wherein determining, based on the non-reselection configuration information, whether to perform the measurement for cell reselection based on the reselection target information comprises:
determining not to perform the measurement for cell reselection based on the reselection target information when a quality of the target cell for reselection measurement is available through a prior measurement.

4. The method according to claim 3, wherein the non-reselection condition information further comprises a quality threshold; and
wherein determining not to perform the measurement for cell reselection based on the reselection target information when the quality of the target cell for reselection measurement is available through the prior measurement comprises:
determining not to perform the measurement for cell reselection based on the reselection target information when the quality of the target cell for reselection measurement is available through the prior measurement and the quality of the target cell for reselection measurement available through the prior measurement is higher than the quality threshold.

5. The method according to claim 2, wherein the non-reselection configuration information comprises non-reselection area information; and
wherein determining, based on the non-reselection configuration information, whether to perform the measurement for cell reselection based on the reselection target information comprises:
determining not to perform the measurement for cell reselection based on the reselection target information reselection configuration information when a terminal device is located in an area indicated by the non-reselection area information.

6. The method according to claim 2, wherein the non-reselection configuration information comprises non-reselection time range information; and
wherein determining, based on the non-reselection configuration information, whether to perform the measurement for cell reselection based on the reselection target information comprises:
determining not to perform another the measurement for cell reselection based on the reselection target information within a non-reselection time range indicated by the non-reselection time range information.

7. The method according to claim 1, wherein the network device is deployed in a non-terrestrial network.

8. The method according to claim 1, wherein the network device is deployed in a non-terrestrial network, and a terrestrial coverage area of the network device changes over time.

9. The method according to claim 1, wherein the information about the target cell for reselection measurement comprises:
a frequency of the target cell; or
a frequency and a physical cell identifier of the target cell.

10. The method according to claim 1, further comprising:
in response to the quality of the target cell not satisfying the first criterion, performing the measurement for cell reselection based on priority information of at least one frequency.

11. An apparatus, comprising:
a non-transitory storage medium storing executable instructions; and
at least one processor; and
wherein the executable instructions, when executed by the at least one processor, cause the apparatus to:
receive reselection configuration information from a network device, wherein the reselection configuration information comprises reselection time information and reselection target information, and the reselection target information indicates information about a target cell for reselection measurement; and
perform measurement for cell reselection preferentially in the target cell based on the reselection target information, wherein a time for the measurement for cell reselection is determined based on the reselection-time information; and
performing reselection to the target cell when a quality of the target cell is available through the measurement and the quality of the target cell satisfies a first criterion.

12. The apparatus according to claim 11, wherein the network device is deployed in a non-terrestrial network.

13. The apparatus according to claim 11, wherein the network device is deployed in a non-terrestrial network, and a terrestrial coverage area of the network device changes over time.

14. The apparatus according to claim 11, wherein the information about the target cell for reselection measurement comprises:
a frequency of the target cell; or
a frequency and a physical cell identifier of the target cell.

15. The apparatus according to claim 11, wherein the executable instructions, when executed by the at least one processor, further cause the apparatus to:
in response to the quality of the target cell not satisfying the first criterion, perform the measurement for cell reselection based on priority information of at least one frequency.

16. A method, comprising:
determining reselection configuration information, wherein the reselection configuration information comprises and reselection target information, and the reselection target information indicates information about a target cell for reselection measurement; and
sending the reselection configuration information to a terminal device, wherein the reselection configuration information is usable by the terminal device to perform measurement for cell reselection preferentially in the target cell based on the reselection target information, wherein a time for the measurement for cell reselection is determined based on the reselection time information, and reselection to the target cell is performed when a quality of the target cell is available through the measurement and the quality of the target cell satisfies a first criterion.

17. The method according to claim 16, further comprising:
sending non-reselection configuration information to the terminal device, wherein the terminal device determines, based on the non-reselection configuration information, whether to perform the measurement for cell reselection based on the reselection configuration information.

18. The method according to claim 16, wherein the method is performed by a network device deployed in a non-terrestrial network.

19. The method according to claim 16, wherein the information about the target cell for reselection measurement comprises:
   a frequency of the target cell; or
   a frequency and a physical cell identifier of the target cell.

20. The method according to claim 16, further comprising:
   wherein when the quality of the target cell does not satisfy the first criterion, the measurement for cell reselection is performed based on priority information of at least one frequency.

* * * * *